(12) United States Patent
Park et al.

(10) Patent No.: US 10,727,536 B2
(45) Date of Patent: Jul. 28, 2020

(54) ORGANIC ELECTROLYTE SOLUTION AND LITHIUM BATTERY INCLUDING THE SAME

(71) Applicants: Samsung Electronics Co., Ltd., Suwon-si, Gyeonggi-do (KR); Samsung SDI Co., Ltd., Yongin-si, Gyeonggi-do (KR)

(72) Inventors: Insun Park, Suwon-si (KR); Myongchun Koh, Hwaseong-si (KR); Dongyoung Kim, Yongin-si (KR); Eunha Park, Seoul (KR); Jihyun Jang, Yongin-si (KR); Yeonji Chung, Yongin-si (KR)

(73) Assignees: SAMSUNG ELECTRONICS CO., LTD., Gyeonggi-Do (KR); SAMSUNG SDI CO., LTD., Gyeonggi-Do (KR)

( * ) Notice: Subject to any disclaimer, the term of this patent is extended or adjusted under 35 U.S.C. 154(b) by 0 days.

(21) Appl. No.: 16/152,498

(22) Filed: Oct. 5, 2018

(65) Prior Publication Data

US 2019/0198931 A1 Jun. 27, 2019

(30) Foreign Application Priority Data

Dec. 27, 2017 (KR) .......................... 10-2017-0181517

(51) Int. Cl.
*H01M 10/0569* (2010.01)
*H01M 10/0525* (2010.01)
(Continued)

(52) U.S. Cl.
CPC ..... *H01M 10/0569* (2013.01); *H01M 4/1315* (2013.01); *H01M 10/0422* (2013.01);
(Continued)

(58) Field of Classification Search
CPC ................................................. H01M 10/0569
(Continued)

(56) References Cited

U.S. PATENT DOCUMENTS

2014/0377635 A1* 12/2014 Matsumoto ........... H01M 4/133
429/163
2019/0020069 A1* 1/2019 Moganty ........... H01M 10/0569

FOREIGN PATENT DOCUMENTS

CN 101867065 A 10/2010
EP 2472661 A1 7/2012
(Continued)

OTHER PUBLICATIONS

Partial European Search Report for European Patent Application No. 18207196 dated Apr. 4, 2019.

*Primary Examiner* — James M Erwin

(74) *Attorney, Agent, or Firm* — Cantor Colburn LLP

(57) ABSTRACT

An organic electrolyte solution includes a lithium salt; an organic solvent; and a fluorine-containing phosphate compound represented by Formula 1:
(Continued)

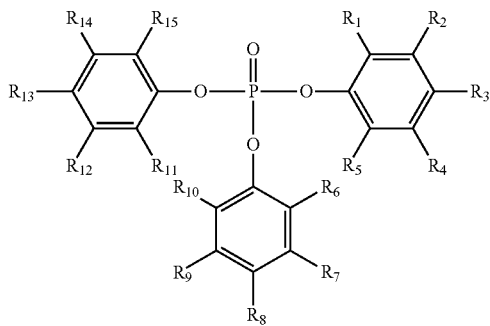

Formula 1 wherein, in Formula 1, $R_1$, $R_2$, $R_3$, $R_4$, $R_5$, $R_6$, $R_7$, $R_8$, $R_9$, $R_{10}$, $R_{11}$, $R_{12}$, $R_{13}$, $R_{14}$, and $R_{15}$ are each independently a hydrogen atom, a fluorine atom, a C1-C5 alkyl group substituted or not substituted with a halogen atom, a C4-C10 cycloalkyl group substituted or not substituted with a halogen atom, a C6-C10 aryl group substituted or not substituted with a halogen atom, a C2-C10 heteroaryl group substituted or not substituted with a halogen atom, or a C2-C10 alkenyl group substituted or not substituted with a halogen atom, at least one of $R_1$, $R_2$, $R_3$, $R_4$, $R_5$, $R_6$, $R_7$, $R_8$, $R_9$, $R_{10}$, $R_{11}$, $R_{12}$, $R_{13}$, $R_{14}$, or $R_{15}$ is a fluorine atom, and at least one phenyl group does not have a fluorine atom.

23 Claims, 1 Drawing Sheet

(51) Int. Cl.
  *H01M 10/04* (2006.01)
  *H01M 4/1315* (2010.01)
  *H01M 10/0567* (2010.01)

(52) U.S. Cl.
  CPC ... *H01M 10/0525* (2013.01); *H01M 10/0567* (2013.01); *H01M 2220/30* (2013.01); *H01M 2300/0034* (2013.01)

(58) Field of Classification Search
  USPC .................................................. 429/326
  See application file for complete search history.

(56) References Cited

FOREIGN PATENT DOCUMENTS

| | | |
|---|---|---|
| JP | 2017004947 A | 1/2017 |
| KR | 1020160135513 A | 11/2016 |
| WO | 2006016733 A1 | 2/2006 |
| WO | 2019018432 A1 | 1/2019 |

* cited by examiner

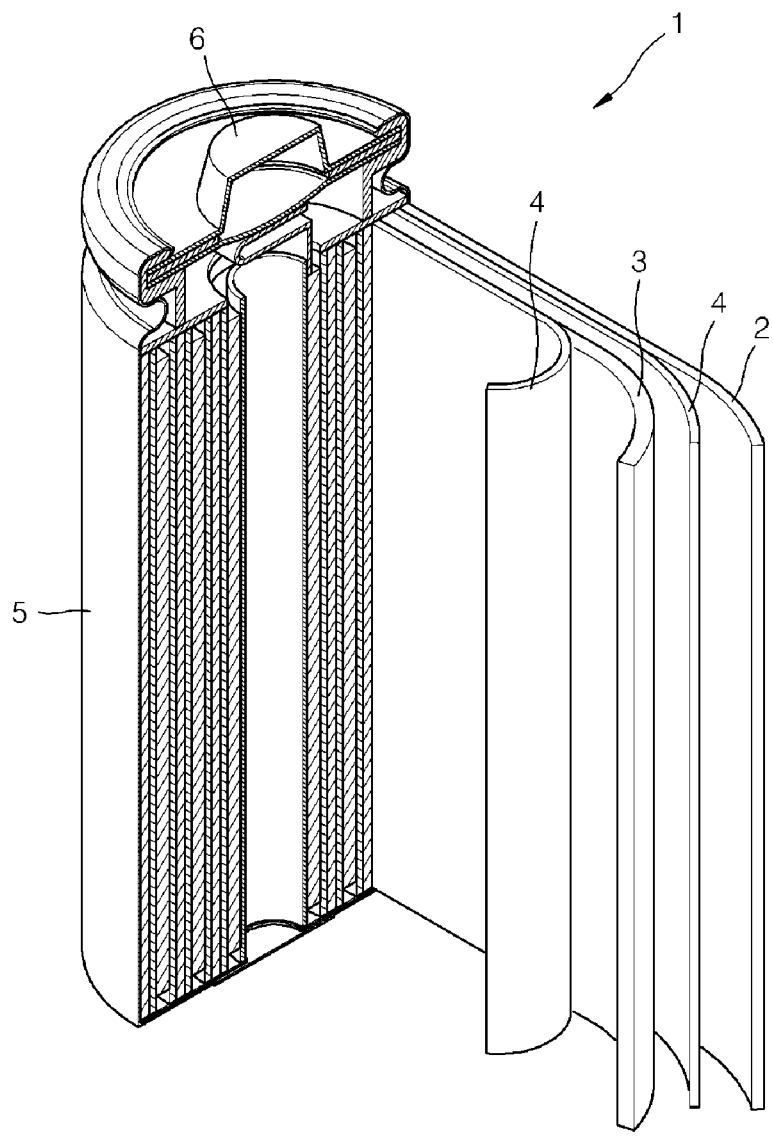

ORGANIC ELECTROLYTE SOLUTION AND LITHIUM BATTERY INCLUDING THE SAME

CROSS-REFERENCE TO RELATED APPLICATION

This application claims priority to and the benefit of Korean Patent Application No. 10-2017-0181517, filed on Dec. 27, 2017, in the Korean Intellectual Property Office, and all the benefits accruing therefrom under 35 U.S.C. § 119, the content of which is incorporated herein by reference in its entirety.

BACKGROUND

1. Field

The present disclosure relates to an organic electrolyte solution and a lithium battery including the same.

2. Description of the Related Art

Lithium secondary batteries are used as driving sources for portable electronic devices, such as, for example, camcorders, mobile phones, and laptop computers. Lithium secondary batteries are rechargeable at high rates and have a specific energy, which is about three times higher than that of lead storage batteries, nickel-cadmium (Ni—Cd) batteries, nickel-hydrogen batteries, or nickel-zinc batteries.

A cathode active material having an increased discharge capacity, may be used to manufacture a lithium-ion secondary battery having high energy density. However, the cathode active material having an increased discharge capacity may also have a relatively low electrochemical stability. Therefore, a side reaction between the cathode active material and an electrolyte may occur during charging/discharging of the lithium secondary battery, and thus the stability of the lithium secondary battery deteriorates over successive charge/discharge cycles. Thus it would be desirable to provide an improved lithium secondary battery by including a cathode active material having an increased discharge capacity and increased electrochemical stability.

SUMMARY

Provided a novel organic electrolyte solution and a lithium battery including the same.

Additional aspects will be set forth in part in the description which follows and, in part, will be apparent from the description, or may be learned by practice of the presented embodiments.

According to an aspect of an embodiment, an organic electrolyte solution includes a lithium salt; an organic solvent; and a fluorine-containing phosphate compound, wherein the fluorine-containing phosphate compound is represented by Formula 1:

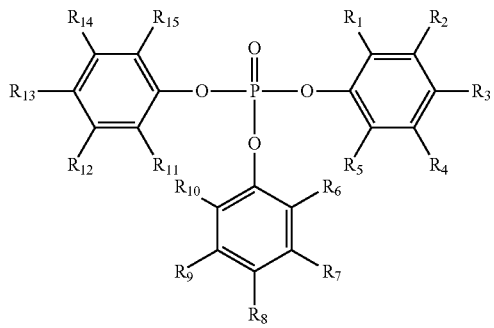

Formula 1 wherein in Formula 1,
$R_1$, $R_2$, $R_3$, $R_4$, $R_5$, $R_6$, $R_7$, $R_8$, $R_9$, $R_{10}$, $R_{11}$, $R_{12}$, $R_{13}$, $R_{14}$, and $R_{15}$ are each independently a hydrogen atom, a fluorine atom, a C1-C5 alkyl group substituted or not substituted with a halogen atom, a C4-C10 cycloalkyl group substituted or not substituted with a halogen, a C6-C10 aryl group substituted or not substituted with a halogen, a C2-C10 heteroaryl group substituted or not substituted with a halogen, or a C2-C10 alkenyl group substituted or not substituted with a halogen atom,
at least one of $R_1$, $R_2$, $R_3$, $R_4$, $R_5$, $R_6$, $R_7$, $R_8$, $R_9$, $R_{10}$, $R_{11}$, $R_{12}$, $R_{13}$, $R_{14}$, and $R_{15}$ is a fluorine atom, and
at least one phenyl group does not have a fluorine atom.

According to another aspect of an embodiment, a lithium battery includes a cathode including a cathode active material; an anode including an anode active material; and the organic electrolyte solution between the cathode and the anode, wherein the cathode active material includes a lithium transition metal oxide including nickel and at least one transition metal other than nickel, and wherein an amount of nickel in the lithium transition metal oxide is about 80 mole percent (mol %) or greater based on the total moles of transition metals.

BRIEF DESCRIPTION OF THE DRAWINGS

These and/or other aspects will become apparent and more readily appreciated from the following description of the embodiments, taken in conjunction with the accompanying drawings in which:

FIG. 1 is a schematic view of a lithium battery, according to an example embodiment.

DETAILED DESCRIPTION

Reference will now be made in detail to embodiments, with reference to the accompanying drawings, in which various embodiments are shown. Like reference numerals refer to like elements throughout. In this regard, the present embodiments may have different forms and should not be construed as being limited to the descriptions set forth herein. Accordingly, the embodiments are merely described below, by referring to the figures, to explain various aspects.

The terminology used herein is for the purpose of describing particular embodiments only and is not intended to be limiting. As used herein, the singular forms "a," "an," and "the" are intended to include the plural forms, including "at least one," unless the content clearly indicates otherwise. For example, "substituted by a fluorine atom" encompasses substitution by one, two, three, or more fluorine atoms. "At least one" is not to be construed as limiting "a" or "an." "Or"

means "and/or." As used herein, the term "and/or" includes any and all combinations of one or more of the associated listed items. Expressions such as "at least one of," when preceding a list of elements, modifies the entire list of elements and does not modify the individual elements of the list.

Hereinafter, as the present inventive concept allows for various changes and numerous embodiments, particular embodiments will be illustrated in the drawings and described in detail in the written description. However, this is not intended to limit the present inventive concept to particular modes of practice, and it is to be appreciated that all changes, equivalents, and substitutes that do not depart from the spirit and technical scope are encompassed in the present inventive concept.

The terms used herein are merely used to describe particular embodiments, and are not intended to limit the present inventive concept. An expression used in the singular encompasses the expression of the plural, unless it has a clearly different meaning in the context. As used herein, it is to be understood that the terms such as "includes," "including," "having," and "comprising" are intended to indicate the presence of the features, numbers, steps, actions, components, parts, ingredients, materials, or combinations thereof disclosed in the specification, but do not preclude the possibility that one or more other features, numbers, steps, actions, components, parts, ingredients, materials, or combinations thereof may exist or may be added. The symbol "/" used herein may be interpreted as "and" or "or" according to the context.

In the drawings, the diameters, lengths, and thicknesses of layers and regions are exaggerated or reduced for clarity. Throughout the specification, it will be understood that when a component, such as a layer, a film, a region, or a plate, is referred to as being "on" another component, the component can be directly on the other component or intervening components may be present thereon. In contrast, when an element is referred to as being "directly on" another element, there are no intervening elements present. Throughout the specification, while such terms as "first," "second," etc., may be used to describe various components, such components are not be limited to the above terms. The above terms are used only to distinguish one component from another. Some of components may not be shown in the drawings for the better understanding of features of the inventive concept but are not intended to omit the components.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, for example, within ±20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Hereinafter, according to example embodiments, an organic electrolyte solution and a lithium battery including the organic electrolyte solution will be described.

According to an embodiment, an organic electrolyte solution includes a lithium salt; an organic solvent; and a fluorine-containing phosphate compound represented by Formula 1:

Formula 1

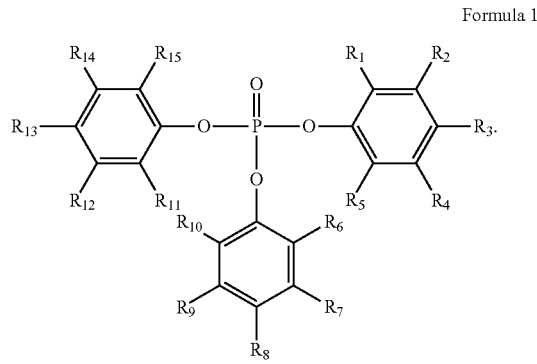

In Formula 1, $R_1$, $R_2$, $R_3$, $R_4$, $R_5$, $R_6$, $R_7$, $R_8$, $R_9$, $R_{10}$, $R_{11}$, $R_{12}$, $R_{13}$, $R_{14}$, and $R_{15}$ are each independently a hydrogen atom, a fluorine atom, a C1-C5 alkyl group substituted or not substituted with a halogen atom, a C4-C10 cycloalkyl group substituted or not substituted with a halogen atom, a C6-C10 aryl group substituted or not substituted with a halogen atom, a C2-C10 heteroaryl group substituted or not substituted with a halogen atom, or a C2-C10 alkenyl group substituted or not substituted with a halogen atom, at least one of $R_1$, $R_2$, $R_3$, $R_4$, $R_5$, $R_6$, $R_7$, $R_8$, $R_9$, $R_{10}$, $R_{11}$, $R_{12}$, $R_{13}$, $R_{14}$, and $R_{15}$ is a fluorine atom, at least one phenyl group does not have a fluorine atom (i.e., is free of fluorine).

In an embodiment in Formula 1, $R_1$, $R_2$, $R_3$, $R_4$, $R_5$, $R_6$, $R_7$, $R_8$, $R_9$, $R_{10}$, $R_{11}$, $R_{12}$, $R_{13}$, $R_{14}$, and $R_{15}$ are each independently a hydrogen atom, a fluorine atom, a C1-C5 alkyl group substituted or not substituted with a fluorine atom, a C4-C10 cycloalkyl group substituted or not substituted with a fluorine atom, a C6-C10 aryl group substituted or not substituted with a fluorine atom, a C2-C10 heteroaryl group substituted or not substituted with a fluorine atom, or a C2-C10 alkenyl group substituted or not substituted with a fluorine atom; at least one of $R_1$, $R_2$, $R_3$, $R_4$, $R_5$, $R_6$, $R_7$, $R_8$, $R_9$, $R_{10}$, $R_{11}$, $R_{12}$, $R_{13}$, $R_{14}$, and $R_{15}$ is a fluorine atom; and at least one of phenyl groups is free of fluorine(i.e., does not have a fluorine atom, or put another way, is not substituted with any fluorine atoms).

Without being bound by theory, it is believed that the fluorine-containing phosphate compound (also referred to herein as a fluorine-containing phosphate-based compound) that is represented by Formula 1, and includes a phenyl group not substituted with fluorine, is stably bonded to or coordinated with a transition metal of the lithium transition metal oxide used as the cathode active material, and thus may serve as a scavenger of protons remaining in the organic electrolyte solution. Thus, the fluorine-containing phosphate compound represented by Formula 1 may suppress elution of a transition metal from the cathode active material in contact with the organic electrolyte solution and may suppress a side reaction of the organic electrolyte solution. As a result, lifespan characteristics of a lithium battery including the organic electrolyte solution including the fluorine-containing phosphate compound represented by Formula 1 may improve, and gas generated by a side reaction with the electrolyte may be suppressed. Again without being limited by theory, it is understood that when the fluorine-containing phosphate compound represented by Formula 1 is used, oxidation at a high voltage may be suppressed, and thus, the fluorine-containing phosphate compound represented by Formula 1 remains in the cathode after charging/discharging over a long period of time, and as a result, deterioration of the lithium battery may be prevented. When the fluorine-containing phosphate compound represented by Formula 1 has an asymmetric structure, i.e., including at least one non-substituted phenyl group, the fluorine-containing phosphate compound represented by Formula 1 may provide improved lifespan characteristics and a decreased internal resistance compared to a fluorine-containing phosphate-based compound having a symmetric structure (i.e., wherein all phenyl groups contain at least one fluorine atom. In some embodiments, an organic electrolyte solution may not include a fluorine-containing phosphate compound having a symmetric structure.

In the organic electrolyte solution, an amount of the fluorine-containing phosphate-based compound represented by Formula 1 may be, for example, 10 weight % (wt %) or less, 8 wt % or less, 5 wt % or less, 4 wt % or less, 3 wt % or less, 2 wt % or less, 1.5 wt % or less, or 1 wt % or less, based on the total weight of the organic electrolyte solution, and provided that an amount of the fluorine-containing phosphate-based compound represented by Formula 1 is present. In the organic electrolyte solution, an amount of the fluorine-containing phosphate-based compound represented by Formula 1 may be, for example, in a range of about 0.01 wt % to about 10 wt %, about 0.01 wt % to about 8 wt %, about 0.01 wt % to about 5 wt %, about 0.01 wt % to about 4 wt %, about 0.01 wt % to about 3 wt %, about 0.01 wt % to about 2 wt %, about 0.01 wt % to about 1.5 wt %, or about 0.01 wt % to about 1 wt %, based on the total weight of the organic electrolyte solution. For example, in the organic electrolyte solution, an amount of the fluorine-containing phosphate-based compound represented by Formula 1 is in a range of about 0.1 wt % to about 2 wt % based on the total weight of the organic electrolyte solution.

In the organic electrolyte solution, the fluorine-containing phosphate-based compound represented by Formula 1 may be, for example, a fluorine-containing phosphate-based compound represented by at least one of Formula 2 or Formula 3:

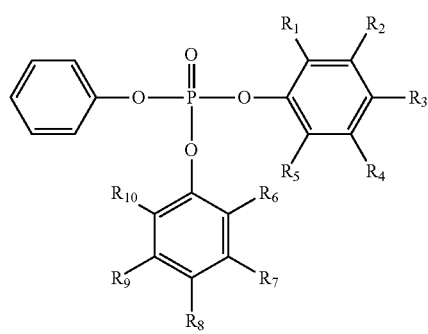

Formula 2

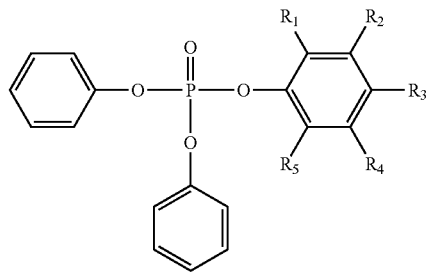

Formula 3

In Formulae 2 and 3, $R_1$, $R_2$, $R_3$, $R_4$, $R_5$, $R_6$, $R_7$, $R_8$, $R_9$, and $R_{10}$ are each independently a hydrogen atom, a fluorine atom, a C1-C5 alkyl group substituted or not substituted with a fluorine atom, a C4-C10 cycloalkyl group substituted or not substituted with a fluorine atom, a C6-C10 aryl group substituted or not substituted with a fluorine atom, a C2-C10 heteroaryl group substituted or not substituted with a fluorine atom, or a C2-C10 alkenyl group substituted or not substituted with a fluorine atom; and at least one of $R_1$, $R_2$, $R_3$, $R_4$, $R_5$, $R_6$, $R_7$, $R_8$, $R_9$, or $R_{10}$ is a fluorine atom.

In the organic electrolyte solution, the fluorine-containing phosphate-based compound represented by Formula 1 may be, for example, a compound represented by at least one of Formula 4 to Formula 9:

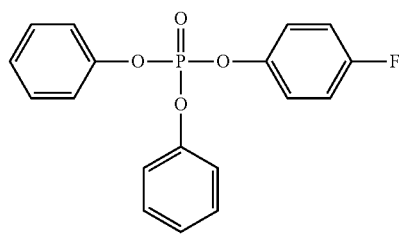

Formula 4

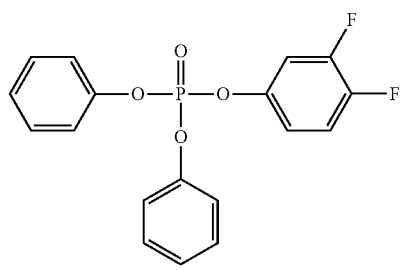

Formula 5

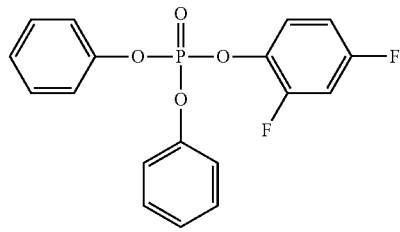

Formula 6

Formula 7
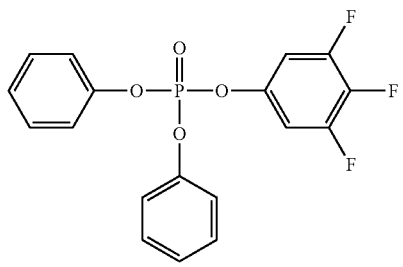

Formula 8
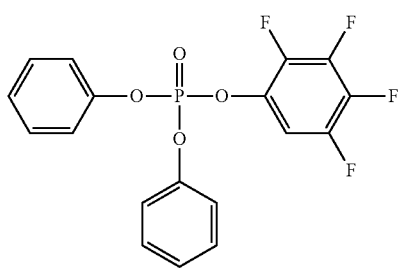

Formula 9
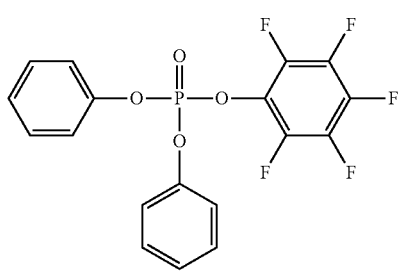

In the organic electrolyte solution, the fluorine-containing phosphate-based compound represented by Formula 1 may be, for example, a compound represented by at least one of Formulae 10 to 15.

Formula 10
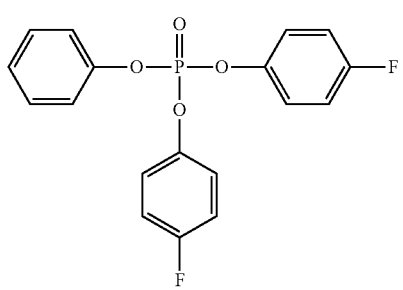

Formula 11
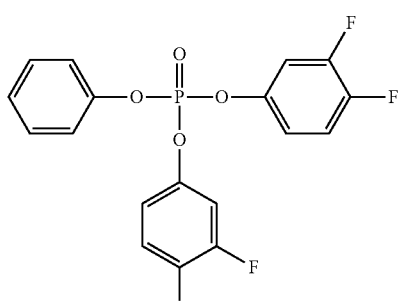

Formula 12
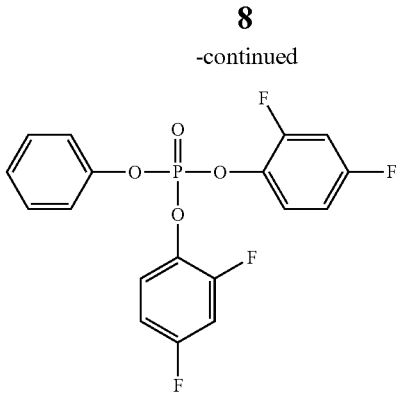

Formula 13
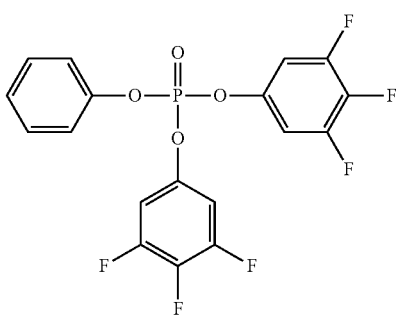

Formula 14
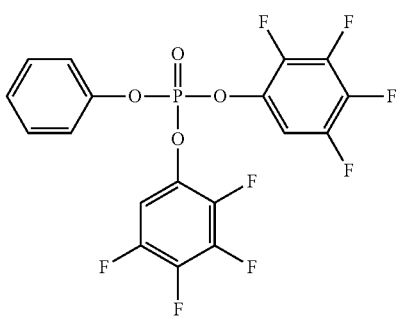

Formula 15
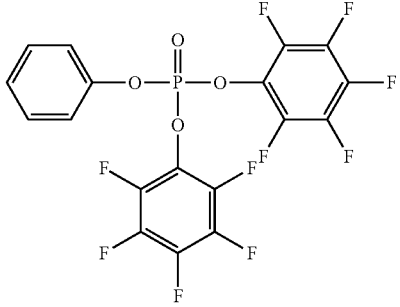

In the organic electrolyte solution, an amount of the fluorine-containing phosphate-based compound represented by Formula 1 may be in a range of about 0.001 wt % to about 2 wt %, about 0.01 wt % to about 2 wt %, about 0.1 wt % to about 2 wt %, or about 0.5 wt % to about 2 wt %, based on the total weight of the organic electrolyte solution. When the amount of the fluorine-containing phosphate-based compound represented by Formula 1 is within these ranges, a lithium battery may have excellent lifespan characteristics. Thus, gas generation may be suppressed without substantial change in lifespan characteristics. When the amount of the fluorine-containing phosphate-based compound represented by Formula 1 is too small, improvement in the lifespan characteristics of the lithium battery is insignificant, and when the amount of the fluorine-containing phosphate-based compound represented by Formula 1 is too great, the high rate characteristics of the lithium battery may deteriorate.

The organic electrolyte solution according to an embodiment may further include at least one compound represented by Formula 16 to Formula 21:

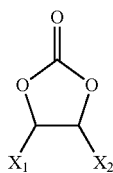

Formula 16

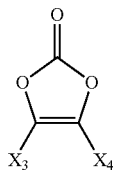

Formula 17

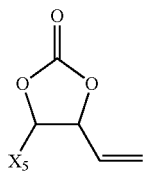

Formula 18

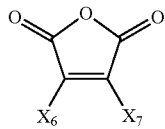

Formula 19

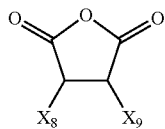

Formula 20

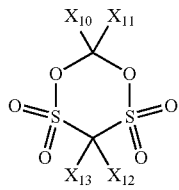

Formula 21

In Formulae 16 to 21, $X_1$, $X_2$, $X_3$, $X_4$, $X_5$, $X_6$, $X_7$, $X_8$, $X_9$, $X_{10}$, $X_{11}$, $X_{12}$, and $X_{13}$ are each independently a hydrogen atom or a halogen atom, and at least one of $X_1$ and $X_2$ is a fluorine atom (F).

When the organic electrolyte solution further includes the cyclic carbonate compound represented by Formula 16, the lifespan characteristics and resistance suppressing effect of the lithium battery may be further improved. For example, in the cyclic carbonate compound represented by Formula 16, $X_1$ is a hydrogen atom, and $X_2$ is F.

An amount of the cyclic carbonate compound represented by Formula 16 may be, for example, 10 volume percent (vol %) or less, 9 vol % or less, 8 vol % or less, 7 vol % or less, 6 vol % or less, or 5 vol % or less, based on the total volume of the organic solvent. In some embodiments, when present, the cyclic carbonate compound represented by Formula 16 may be present in an amount of up to 10 vol %, up to 9 vol %, up to 8 vol %, up to 7 vol %, up to 6 vol %, or up to 5 vol %, based on the total volume of the organic solvent. An amount of the cyclic carbonate compound represented by Formula 16 may be in a range of about 0.1 vol % to about 10 vol %, about 0.1 vol % to about 9 vol %, about 0.1 vol % to about 8 vol %, about 0.1 vol % to about 7 vol %, about 0.1 vol % to about 6 vol %, or about 0.1 vol % to about 5 vol %, based on the total volume of the organic solvent. When the amount of the cyclic carbonate compound represented by Formula 16 is within these ranges, lifespan characteristics and resistance suppressing effect of the lithium battery may further improve.

When the organic electrolyte solution further includes a cyclic carbonate compound represented by Formula 17 and/or Formula 18, lifespan characteristics and resistance suppressing effect of the lithium battery may be further improved. For example, in the cyclic carbonate compounds represented by Formula 17 and/or Formula 18, $X_3$ and $X_4$ may both be hydrogen. An amount of each of the cyclic carbonate compounds represented by Formula 17 and/or Formula 18 may be, for example, 3 wt % or less, 2.5 wt % or less, 2 wt % or less, or 1.5 wt % or less, based on the total weight of the organic electrolyte solution. An amount of each of the cyclic carbonate compounds represented by Formula 17 and/or Formula 18 may be, for example, up to 3 wt %, up to 2.5 wt %, up to 2 wt %, or up to 5 wt %, based on the total weight of the organic electrolyte solution. An amount of the cyclic carbonate compound represented by Formula 17 and/or Formula 18 may be, for example, in a range of about 0.1 wt % to about 3 wt %, about 0.1 wt % to about 2.5 wt %, about 0.1 wt % to about 2 wt %, or about 0.1 wt % to about 1.5 wt %, based on the total weight of the organic electrolyte solution. When the amount of the cyclic carbonate compound represented by Formula 17 and/or Formula 18 is within these ranges, lifespan characteristics and resistance suppressing effect of the lithium battery may further improve.

When the organic electrolyte solution further includes a cyclic acid anhydride compound represented by Formulae 19 and/or 20, cycle characteristics of the lithium battery may be further improved. For example, in the cyclic acid anhydride compound represented by Formula 19 and/or Formula 20, $X_6$, $X_7$, $X_8$, and $X_9$ may be hydrogen. An amount of the cyclic acid anhydride compound represented by Formula 19 and/or Formula 20 may be, for example, 3 wt % or less, 2.5 wt % or less, 2 wt % or less, or 1.5 wt % or less, based on the total weight of the organic electrolyte solution. An amount of the cyclic acid anhydride compound represented by Formula 19 and/or Formula 20 may be, for example, up to 3 wt %, or up to 2.5 wt %, or up to 2 wt %, or up to 1.5 wt %, based on the total weight of the organic electrolyte solution. An amount of the cyclic acid anhydride compound represented by Formula 19 and/or Formula 20 may be, for example, in a range of about 0.1 wt % to about 3 wt %, about 0.1 wt % to about 2.5 wt %, about 0.1 wt % to about 2 wt %, or about 0.1 wt % to about 1.5 wt %, based on the total weight of the organic electrolyte solution. When the amount of the cyclic acid anhydride compound represented by Formula 19 and/or Formula 20 is within these ranges, cycle characteristics of the lithium battery may be further improved.

When the organic electrolyte solution further includes a cyclic disulfonate compound represented by Formula 21, cycle characteristics of the lithium battery may be further improved. For example, in the cyclic disulfonate compound represented by Formula 21, $X_{10}$, $X_{11}$, $X_{12}$, and $X_{13}$ may be hydrogen.

An amount of the cyclic disulfonate compound represented by Formula 21 may be, for example, 3 wt % or less, 2.5 wt % or less, 2.0 wt % or less, or 1.5 wt % or less, based on the total weight of the organic electrolyte solution. An amount of the cyclic disulfonate compound represented by Formula 21 may be, for example, up to 3 wt %, or up to 2.5 wt %, or up to 2 wt %, or up to 1.5 wt %, based on the total weight of the organic electrolyte solution. An amount of the cyclic disulfonate compound represented by Formula 21 may be, for example, in a range of about 0.1 wt % to about 3 wt %, about 0.1 wt % to about 2.5 wt %, about 0.1 wt % to about 2 wt %, or about 0.1 wt % to about 1.5 wt %, based on the total weight of the organic electrolyte solution. When the amount of the cyclic disulfonate compound represented by Formula 21 is within these ranges, cycle characteristics of the lithium battery may be further improved.

The organic solvent may, for example, include at least one of a carbonate solvent, an ester solvent, an ether solvent, or a ketone solvent.

Examples of the carbonate solvent may include carbonate-based solvents such as ethylmethyl carbonate (EMC), methylpropyl carbonate (MPC), ethylpropyl carbonate (EPC), dimethyl carbonate (DMC), diethyl carbonate (DEC), dipropyl carbonate (DPC), propylene carbonate (PC), ethylene carbonate (EC), or butylene carbonate (BC); examples of the ester solvent may include ester-based solvents such as methyl propionate, ethyl propionate, ethyl butyrate, methyl acetate, ethyl acetate, n-propyl acetate, dimethyl acetate, gamma-butyrolactone, decanolide, gamma-valerolactone, mevalonolactone, or caprolactone; examples of the ether solvent include ether-based solvents such as dibutyl ether, tetraglyme, diglyme, dimethoxyethane, 2-methyltetrahydrofuran, or tetrahydrofuran, or a combination thereof; and examples of the ketone solvent include ketone-based solvents such as cyclohexanone; examples of the nitrile solvent include nitrile-based solvents such as acetonitrile (AN), succinonitrile (SN), or adiponitrile, but embodiments are not limited thereto. Examples of other solvents that may be used include dimethyl sulfoxide, dimethyl formamide, dimethyl acetamide, and tetrahydrofuran, but embodiments are not limited thereto. A combination comprising at least one of the foregoing solvents may also be used.

For example, the organic solvent may be a solvent mixture including about 50 vol % to about 95 vol % of chain-type (i.e., non-cyclic) carbonate and about 5 vol % to about 50 vol % of cyclic carbonate, or about 55 vol % to about 95 vol % of chain-type carbonate and about 5 vol % to about 45 vol % of cyclic carbonate, or about 60 vol % to about 95 vol % of chain-type carbonate and about 5 vol % to about 40 vol % of cyclic carbonate, or about 65 vol % to about 95 vol % of chain-type carbonate and about 5 vol % to about 35 vol % of cyclic carbonate, or about 70 vol % to about 95 vol % of chain-type carbonate and about 5 vol % to about 30 vol % of cyclic carbonate. For example, the organic solvent is a solvent mixture including at least three organic solvents.

For example, the organic electrolyte solution may include about 0.01 wt % to about 2.0 wt % of a fluorine-containing phosphate-based compound represented by one of Formula 4 to Formula 15, about 0.1 wt % to about 2.0 wt % of a compound represented by Formula 17a, about 0.1 wt % to about 1.0 wt % of a compound represented by Formula 19a, and about 0.1 wt % to about 1.0 wt % of a compound represented by Formula 21a, wherein the weight percents are based on the total weight of the organic electrolyte solution, and the organic solvent includes about 1 vol % to about 10 vol % of a compound represented by Formula 16a based on the total volume of the organic solvent:

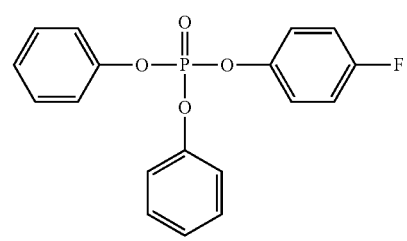

Formula 4

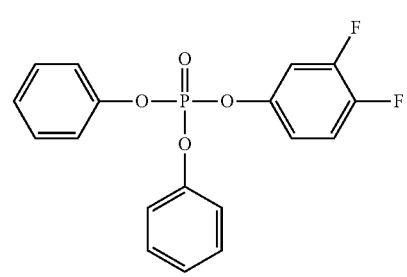

Formula 5

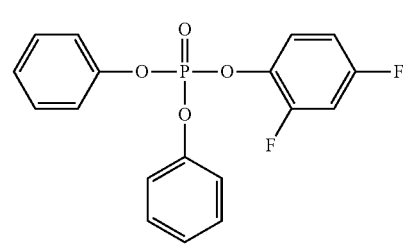

Formula 6

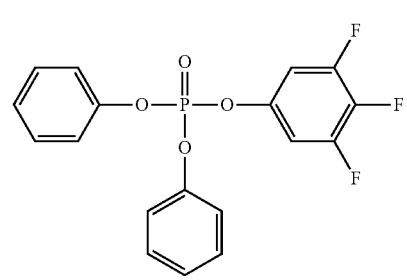

Formula 7

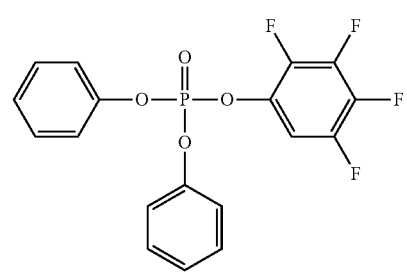

Formula 8

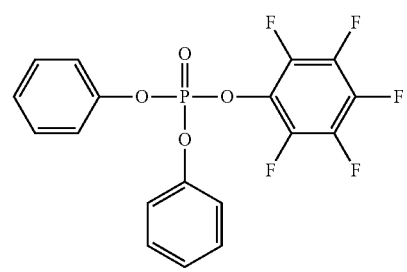

Formula 9

Formula 10

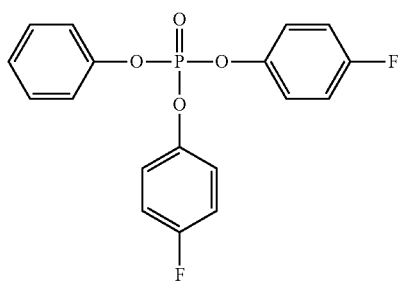

Formula 11

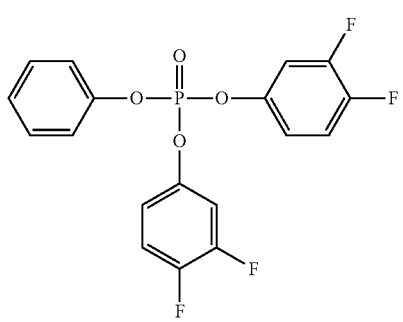

Formula 12

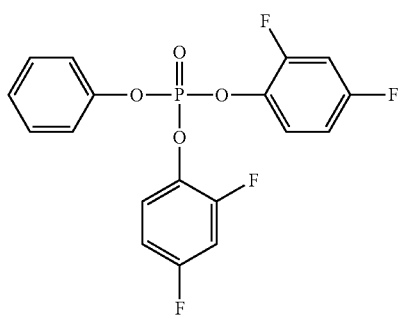

Formula 13

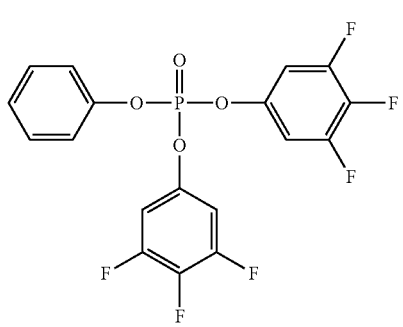

Formula 14

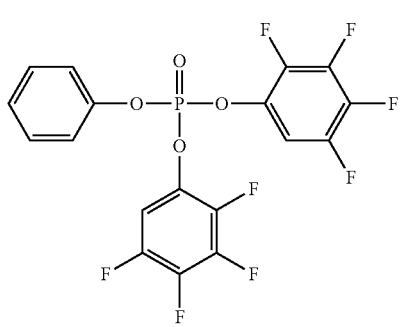

Formula 15

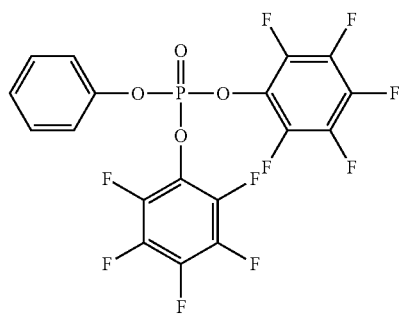

Formula 16a

Formula 17a

Formula 19a

Formula 21a

The lithium salt may include at least one of $LiPF_6$, $LiBF_4$, $LiCF_3SO_3$, $Li(CF_3SO_2)_2N$, $LiC_2F_5SO_3$, $Li(FSO_2)_2N$, $LiC_4F_9SO_3$, $LiN(SO_2CF_2CF_3)_2$, or a compound represented by Formula 30 to Formula 33 but embodiments are not limited thereto, and any material available as a lithium salt in the art may be used.

Formula 30

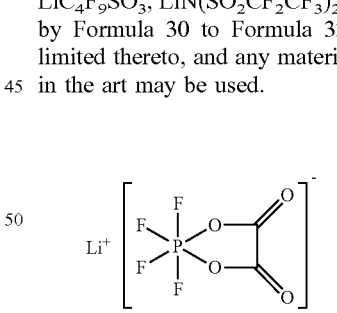

Formula 31

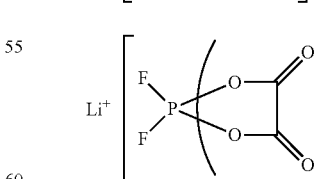

Formula 32

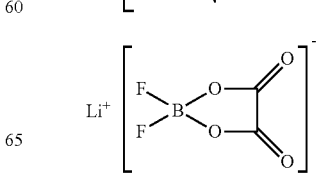

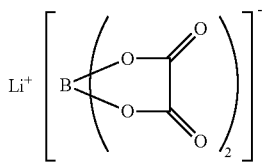

Formula 33

The organic electrolyte solution according to an embodiment may not include LiFSI.

A concentration of the lithium salt included in the organic electrolyte solution may be in a range of about 0.01 molar (M) to about 5.0 M, or about 0.05 M to about 5.0 M, about 0.1 M to about 5.0 M, or about 0.1 M to about 2.0 M, but embodiments are not limited thereto, and the concentration of lithium salt may be modified according as needed. When the concentration of the lithium salt is within the above-described ranges, battery characteristics may be further improved.

According to another embodiment, a lithium battery includes a cathode including a cathode active material; an anode including an anode active material; and the organic electrolyte solution between the cathode and the anode, wherein the cathode active material includes a lithium transition metal oxide including nickel and at least one transition metal other than nickel, and an amount of nickel in the lithium transition metal oxide is about 80 mole percent (mol %) or greater based on the total moles of transition metals.

When the cathode active material is a lithium transition metal oxide including nickel and a transition metal other than nickel, and an amount of nickel in the lithium transition metal oxide is 80 mol % or greater, a lithium battery having high output and high capacity may be manufactured. Without being limited by theory, it is understood that when a lithium transition metal oxide having a high content of nickel is included in a lithium battery, a surface structure of the lithium transition metal oxide may be unstable, gas generation caused by a side reaction during charging/discharging of the battery may occur, and elution of transition metals such as nickel may be enhanced. Thus, lifespan characteristics of the lithium battery may deteriorate. On the other hand, a lithium battery including a fluorine-containing phosphate compound according to an embodiment, has improved characteristics. In particular, when the lithium battery includes an electrolyte solution including the fluorine-containing phosphate-based compound having a phenyl group that is not substituted with fluorine in an amount of about 2 wt % or less based on the total weight of the organic electrolyte solution, the lithium battery may have improved lifespan characteristics and reduced internal resistance, which may suppress gas generation caused by a side reaction.

The cathode active material includes a lithium transition metal oxide including nickel and at least one transition metal other than nickel. In the lithium transition metal oxide an amount of nickel may be about 80 mol % or greater, or about 82 mol % or greater, or about 85 mol % or greater, or about 87 mol % or greater, or about 90 mol % or greater based on the total moles of transition metals.

For example, the lithium transition metal oxide may be a compound represented by Formula 23:

$$Li_aNi_xCo_yM_zO_{2-b}A_b \qquad \text{Formula 23}$$

In Formula 23, $1.0 \le a \le 1.2$, $0 \le b \le 0.2$, $0.8 \le x < 1$, $0 < y \le 0.3$, $0 < z \le 0.3$, and $x+y+z=1$; M is at least one of manganese (Mn), vanadium (V), magnesium (Mg), gallium (Ga), silicon (Si), tungsten (W), molybdenum (Mo), iron (Fe), chrome (Cr), copper (Cu), zinc (Zn), titanium (Ti), aluminum (Al), or boron (B); and A is F, S, Cl, Br, or a combination thereof. For example, $0.8 \le x < 1$, $0 < y \le 0.2$, and $0 < z \le 0.2$; $0.83 \le x < 0.97$, $0 < y \le 0.15$, and $0 < z \le 0.15$; or $0.85 \le x < 0.95$, $0 < y \le 0.1$, and $0 < z \le 0.1$.

For example, the lithium transition metal oxide may be a compound represented by one of Formulae 24 and 25:

$$LiNi_xCo_yMn_zO_2 \qquad \text{Formula 24}$$

$$LiNi_xCo_yAl_zO_2 \qquad \text{Formula 25}$$

In Formula 24 and Formula 25, $0.8 \le x \le 0.95$, $0 < y \le 0.2$, and $0 < z \le 0.1$. For example, $0.82 \le x \le 0.95$, $0 < y \le 0.15$, and $0 < z \le 0.15$. For example, $0.85 \le x \le 0.95$, $0 < y \le 0.1$, and $0 < z \le 0.1$.

The lithium transition metal oxide may include, for example, $LiNi_{0.7}Co_{0.2}Mn_{0.1}O_2$, $LiNi_{0.88}Co_{0.08}Mn_{0.04}O_2$, $LiNi_{0.8}Co_{0.15}Mn_{0.05}O_2$, $LiNi_{0.8}Co_{0.1}Mn_{0.02}O_2$, $LiNi_{0.88}Co_{0.1}Mn_{0.02}O_2$, $LiNi_{0.8}Co_{0.15}Al_{0.05}O_2$, $LiNi_{0.8}Co_{0.1}Mn_{0.2}O_2$, $LiNi_{0.88}Co_{0.1}Al_{0.02}O_2$, or a combination thereof.

The anode active material may include at least one of a silicon-based compound, a carbon-based compound, a composite of a silicon-based compound and a carbon-based compound, or a silicon oxide ($SiO_x$, where $0<x<2$). For example, the silicon-based compound may be silicon nanoparticles. For example, the carbon-based compound may be graphite.

For example, the composite of a silicon-based compound and a carbon-based compound may include silicon nanoparticles. For example, the composite of a silicon-based compound and a carbon-based compound may be a composite having a structure in which silicon nanoparticles are disposed (e.g., coated) on a carbon-based compound, a composite having a structure in which silicon particles are disposed on and inside a carbon-based compound, or a composite having a structure in which silicon particles are coated with the carbon-based compound. For example, the composite of a silicon-based compound and a carbon-based compound may be an active material obtained by dispersing silicon nanoparticles having a particle size of about 200 nanometers (nm) or less on carbon-based compound particles and then coating the silicon nanoparticles with the carbon-based compound particles. For example, the composite of a silicon-based compound and a carbon-based compound may be an active material having silicon (Si) particles disposed on and inside graphite.

As used herein, the term "size" or "particle size" denotes an average diameter when particles are spherical or an average length dimension, such as a dimension along a major surface, when particles are non-spherical. For example, the size of particles may be measured by using a particle size analyzer (PSA).

For example, a particle size of the composite (e.g., a secondary particle size) of a silicon-based compound and a carbon-based compound may be in a range of about 5 micrometers (μm) to about 20 μm, or about 5 μm to about 18 μm, or about 7 μm to about 18 μm, or about 7 μm to about 15 μm, or about 10 μm to about 13 μm. For example, a particle size of the composite of a silicon-based compound and a carbon-based compound may be a secondary particle size (average diameter). For example, a size of silicon nanoparticles may be a primary particle size, and may be in a range of 5 nm or greater, or 10 nm or greater, or 20 nm or greater, or 50 nm or greater, or 70 nm or greater. For example, a size of silicon nanoparticles may be 300 nm or less, or 200 nm or less, or 150 nm or less, or 100 nm or less, or 50 nm or less, or 20 nm or less, or 10 nm or less. For example, a size of silicon nanoparticles may be in a range of about 10 nm to about 250 nm. For example, the size of silicon nanoparticles may be an average diameter.

For example, a capacity retention ratio of the lithium battery at 45° C. may be about 70% or greater, about 75% or greater, or about 78% or greater, as measured after 200 cycles of charging/discharging. For example, a direct current internal resistance (DCIR) increase ratio of the lithium battery at 45° C. may be about 20% or less, about 18% or less, about 15% or less, about 12% or less, about 10% or less, or about 5% or less, or in a range of about 5% to about 20%, as measured after 200 cycles of charging/discharging. When the lithium battery has an excellent capacity retention ratio and a low DCIR increase ratio at 45° C. after 200 cycles, cycle characteristics of the lithium battery may be improved.

For example, an energy density per cell unit volume of the lithium battery may be about 500 Watt hours per liter (Wh/L) or greater, about 550 Wh/L or greater, about 600 Wh/L or greater, about 650 Wh/L or greater, or about 700 Wh/L or greater. When the lithium battery has a high energy density of about 500 Wh/L or greater, the lithium battery may have a high output.

A type of the lithium battery is not particularly limited, and the lithium battery may be a lithium ion battery, a lithium ion polymer battery, or a lithium sulfur battery.

In some embodiments, the lithium battery may be manufactured in the following manner.

First, a cathode is prepared.

For example, a cathode active material, a conducting agent, a binder, and a solvent are mixed to prepare a cathode active material composition. In some embodiments, the cathode active material composition may be directly coated on a cathode current collector to prepare a cathode plate. In some embodiments, the cathode active material composition may be cast on a separate support to form a cathode active material film, which may then be separated from the support and laminated on a cathode current collector to prepare a cathode plate. The cathode is not limited to the examples described above, and may be one of a variety of types.

The cathode active material may be, for example, a lithium-containing metal oxide. In some embodiments, the cathode active material may be at least one of a composite oxide of lithium with a metal including Co, Mn, Ni, or a combination thereof. In some embodiments, the cathode active material may be a compound represented by one of the following formulae:

$Li_aA_{1-b}B'_bD'_2$ (where $0.90 \leq a \leq 1.8$ and $0 \leq b \leq 0.5$); $Li_aE_{1-b}B'_bO_{2-c}D'_c$ (where $0.90 \leq a \leq 1.8$, $0 \leq b \leq 0.5$, and $0 \leq c \leq 0.05$); $LiE_{2-b}B'_bO_{4-c}D'_c$ (where $0 \leq b \leq 0.5$ and $0 \leq c \leq 0.05$); $Li_aNi_{1-b-c}Co_bB'_cD'_\alpha$ (where $0.90 \leq a \leq 1.8$, $0 \leq b \leq 0.5$, $0 \leq c \leq 0.05$, and $0 < \alpha \leq 2$); $Li_aNi_{1-b-c}Co_bB'_cO_{2-\alpha}F'_\alpha$ (where $0.90 \leq a \leq 1.8$, $0 \leq b \leq 0.5$, $0 \leq c \leq 0.05$, and $0 < \alpha < 2$); $Li_aNi_{1-b-c}Co_bB'_cO_{2-\alpha}F'_2$ (where $0.90 \leq a \leq 1.8$, $0 \leq b \leq 0.5$, $0 \leq c \leq 0.05$, and $0 < \alpha < 2$); $Li_aNi_{1-b-c}Mn_bB'_cD'_\alpha$ (where $0.90 \leq a \leq 1.8$, $0 \leq b \leq 0.5$, $0 \leq c \leq 0.05$, and $0 < \alpha \leq 2$); $Li_aNi_{1-b-c}Mn_bB'_cO_{2-\alpha}F'_\alpha$ (where $0.90 \leq a \leq 1.8$, $0 \leq b \leq 0.5$, $0 \leq c \leq 0.05$, and $0 < \alpha < 2$); $Li_aNi_{1-b-c}Mn_bB'_cO_{2-\alpha}F'_2$ (where $0.90 \leq a \leq 1.8$, $0 \leq b \leq 0.5$, $0 \leq c \leq 0.05$, and $0 < \alpha < 2$); $Li_aNi_bE_cG_dO_2$ (where $0.90 \leq a \leq 1.8$, $0 \leq b \leq 0.9$, $0 \leq c \leq 0.5$, and $0.001 < \alpha < 0.1$.); $Li_aNi_bCo_cMn_dGeO_2$ (where $0.90 \leq a \leq 1.8$, $0 \leq b \leq 0.9$, $0 \leq c \leq 0.5$, $0 \leq d \leq 0.5$, and $0.001 \leq e \leq 0.1$.); $Li_aNiG_bO_2$ (where $0.90 \leq a \leq 1.8$ and $0.001 \leq b \leq 0.1$.); $Li_aCoG_bO_2$ (where $0.90 \leq a \leq 1.8$ and $0.001 \leq b \leq 0.1$.); $Li_aMnG_bO_2$ (where $0.90 \leq a \leq 1.8$ and $0.001 \leq b \leq 0.1$.); $Li_aMn_2G_bO_4$ (where $0.90 \leq a \leq 1.8$ and $0.001 \leq b \leq 0.1$.); $QO_2$; $QS_2$; $LiQS_2$; $V_2O_5$; $LiV_2O_5$; $LiI'O_2$; $LiNiVO_4$; $Li_{(3-f)}J_2(PO_4)_3$ (where $0 \leq f \leq 2$); $Li_{(3-f)}Fe_2(PO_4)_3$ (where $0 \leq f \leq 2$); and $LiFePO_4$.

In the formulae above, A may include nickel (Ni), cobalt (Co), manganese (Mn), or a combination thereof; B' may include aluminum (Al), nickel (Ni), cobalt (Co), manganese (Mn), chromium (Cr), iron (Fe), magnesium (Mg), strontium (Sr), vanadium (V), a rare earth element, or a combination thereof; D' may include oxygen (O), fluorine (F), sulfur (S), phosphorus (P), or a combination thereof; E may include cobalt (Co), manganese (Mn), or a combination thereof; F' include fluorine (F), sulfur (S), phosphorus (P), or a combination thereof; G may include aluminum (Al), chromium (Cr), manganese (Mn), iron (Fe), magnesium (Mg), lanthanum (La), cerium (Ce), strontium (Sr), vanadium (V), or a combination thereof; Q may include titanium (Ti), molybdenum (Mo), manganese (Mn), or a combination thereof; I' may include chromium (Cr), vanadium (V), iron (Fe), scandium (Sc), yttrium (Y), or a combination thereof; and J may include vanadium (V), chromium (Cr), manganese (Mn), cobalt (Co), nickel (Ni), copper (Cu), or a combination thereof.

The lithium-containing metal oxide according to an embodiment may be a composite having a coating layer on a surface of the compounds listed above, or may be a mixture of a compound without a coating layer and a compound having a coating layer, the compounds being at least one of the compounds listed above.

In some embodiments, the coating layer may include at least one compound of a coating element, including for example, an oxide, a hydroxide, an oxyhydroxide, an oxycarbonate, or a hydroxycarbonate of the coating element. In some embodiments, the compound for the coating layer may be amorphous or crystalline. In some embodiments, the coating element for the coating layer may include magnesium (Mg), aluminum (Al), cobalt (Co), potassium (K), sodium (Na), calcium (Ca), silicon (Si), titanium (Ti), vanadium (V), tin (Sn), germanium (Ge), gallium (Ga), boron (B), arsenic (As), zirconium (Zr), or a combination thereof. In some embodiments, the coating layer may be formed using any method that does not adversely affect the physical properties of the cathode active material. For example, the coating layer may be formed using a spray coating method or a dipping method. The coating methods are well known to those of ordinary skill in the art, and thus a detailed description thereof is omitted.

In some embodiments, the lithium-containing metal oxide may include, for example, $LiNiO_2$, $LiCoO_2$, $LiMn_xO_{2x}$ (where $x=1$ or $2$), $LiNi_{1-x}Mn_xO_2$ (where $0<x<1$), $LiNi_{1-x-y}Co_xMn_yO_2$ (where $0 \leq x \leq 0.5$ and $0 \leq y \leq 05$), $LiFePO_4$, or a combination thereof.

As the conducting agent, any suitable material may be used as long as it has electrical conductivity and does not cause a chemical change in the lithium battery. Examples of the conducting agent include graphite, such as natural graphite or artificial graphite; a carbonaceous material, such as carbon black, acetylene black, ketjen black, channel black, furnace black, lamp black, or summer black; conductive fiber, such as carbon fiber or metal fiber; fluorocarbon; a metal powder, such as aluminum powder or nickel powder; a conductive whisker, such as zinc oxide or potassium titanate; and a conductive polymer, such as a polyphenylene derivative. A combination comprising at least one of the foregoing conducting agents may also be used. An amount of the conducting agent may be in a range of about 1 wt % to about 20 wt %, or about 2 wt % to about 18 wt %, or about 5 wt % to about 15 wt % based on the total weight of the cathode active material composition.

The binder in the cathode active material composition is a component that assists in binding between the cathode active material and an additive such as a conducting agent or in binding between a current collector and the cathode active material. Examples of the binder include polyvinylidene fluoride (PVdF), polyvinylidene chloride, polybenzimidazole, polyimide, polyvinyl acetate, polyacrylonitrile, polyvinyl alcohol, carboxymethyl cellulose (CMC), starch, hydroxypropyl cellulose, regenerated cellulose, polyvinylpyrrolidone, polyethylene, polypropylene, polystyrene, polymethylmethacrylate, polyaniline, acrylonitrile butadiene styrene, phenol resin, epoxy resin, polyethylene terephthalate, polytetrafluoroethylene, polyphenylene sulfide, polyamide imide, polyether imide, polyether sulfone, polyamide, polyacetal, polyphenylene oxide, polybutylene terephthalate, ethylene-propylene-diene terpolymer (EPDM), sulfonated EPDM, styrene butadiene rubber (SBR), fluorine rubber, or various copolymers thereof, or a combination thereof but embodiments are not limited thereto. For example, an amount of the binder may be in a range of about 1 wt % to about 30 wt %, or about 2 wt % to about 25 wt %, or about 5 wt % to about 20 wt % based on the total weight of the cathode active material composition.

Examples of the solvent include N-methyl-pyrrolidone, acetone, water, or a combination thereof, but embodiments are not limited thereto. Any material suitable for use as a solvent may be used. An amount of the solvent may be, for example, in a range of about 10 parts by weight to about 100 parts by weight, or about 15 parts by weight to about 100 parts by weight, or about 20 parts by weight to about 85 parts by weight, based on 100 parts by weight of the cathode active material. When the amount of the solvent is within the ranges described above, the cathode active material layer may be easily formed.

The amounts of the cathode active material, the conducting agent, the binder, and the solvent may be may be determined by those of skill in the art without undue experimentation. At least one of the conducting agent, the binder, and the solvent may be omitted according to the desired use and structure of the lithium battery.

In the cathode according to an embodiment, NMP may be used as a solvent, PVdF or a PVdF copolymer may be used as a binder, and carbon black or acetylene black may be used as a conducting agent. In the cathode according to an embodiment, 94 wt % of the cathode active material, 3 wt % of the binder, and 3 wt % of the conducting agent may be mixed to provide a mixture in the form of a powder, NMP is added to the mixture to prepare a slurry having a solids content of about 70 wt %, and the slurry may be coated, dried, and pressed to prepare a cathode.

A thickness of the cathode current collector may be in a range of about 3 μm to about 500 μm, or about 5 μm to about 300 μm, or about 10 μm to about 250 μm. A material for the cathode current collector is not particularly limited as long as it has high electrical conductivity and does not cause a chemical change in a corresponding lithium battery. Examples of the cathode current collector include stainless steel, aluminum, nickel, titanium, calcined carbon, aluminum, or stainless steel that is surface treated with carbon, nickel, titanium, or silver, or a combination thereof. A surface of the cathode current collector may have a fine uneven structure in order to increase a binding force between the cathode current collector and the cathode active material. The cathode current collector may have any of various shapes, such as film, sheet, foil, net, porous, foam, or non-woven shape.

A loading level of the cathode active material composition may be, for example, about 30 milligrams per square centimeter ($mg/cm^2$) or greater, about 35 $mg/cm^2$ or greater, or about 40 $mg/cm^2$ or greater. A cathode density may be, for example, about 3 grams per cubic centimeter (g/cc) or greater, or about 3.5 g/cc or greater, or about 4 g/cc or greater. A cathode having a high energy density, may have a loading level in a range of about 35 $mg/cm^2$ to about 50 $mg/cm^2$ and a cathode density in a range of about 3.5 g/cc to about 4.2 g/cc. For example, the cathode is a cathode plate in which both surfaces are coated with the cathode active material composition at a loading level of 37 mg/cc and which has a cathode density of 3.6 g/cc.

When the loading level and the cathode density of the cathode active material satisfy the above-described ranges, a lithium battery including the cathode active material may exhibit a cell energy density of about 500 Wh/L or greater. In the lithium battery, a DCIR increase ratio at 45° C. after 200 cycles of a charging process may be about 20% or less.

Next, an anode is prepared.

For example, an anode active material, a conducting agent, a binder, and a solvent are mixed to prepare an anode active material composition. In some embodiments, the anode active material composition may be directly coated on a metallic current collector and dried to prepare an anode plate. In some embodiments, the anode active material composition may be cast on a separate support to form an anode active material film, which may then be separated from the support and laminated on a metallic current collector to prepare an anode plate. A shape of the anode is not limited thereto, and the anode may have various shapes.

Examples of the anode active material may be a silicon-based compound, a silicon oxide ($SiO_x$, where $0<x<2$), or a composite of a silicon-based compound and a carbon-based material. Here, a size of silicon particles may be 300 nm or less or, for example, in a range of about 10 nm to about 250 nm. As previously described, the term "size" denotes an average diameter when the silicon particles are spherical or an average length dimension when the silicon particles are non-spherical.

When the size of the silicon particles is within the above-described range, lifespan characteristics of the lithium battery may be excellent. Thus, when the electrolyte according to an embodiment is used, lifespan of a lithium secondary battery may further improve.

Examples of the carbonaceous material include crystalline carbon, amorphous carbon, or a combination thereof. Examples of the crystalline carbon include graphite, such as natural graphite or artificial graphite, having a shapeless, plate, flake, spherical, or fibrous form. Examples of the amorphous carbon include soft carbon (carbon sintered at low temperatures), hard carbon, a meso-phase pitch carbide, sintered coke, or a combination thereof.

The composite of a silicon-based compound and a carbon-based material may be, for example, a composite having a structure including silicon particles disposed (coated) on graphite or a composite including silicone particles disposed on and inside graphite. For example, the composite may be an active material, in which Si primary particles having an average particle diameter of about 200 nm or less or, for example, in a range of about 100 nm to about 200 nm, or 150 nm, are disposed on graphite particles and then coated with a carbon-based material, or an active material in which silicon particles are disposed on and inside graphite. These composites may be obtained under the product name "SCN1" (Si particle on graphite) or "SCN2" (Si particle inside as well as on graphite). SCN1 is an active material obtained by dispersing silicon particles having an average particle diameter of about 150 nm on graphite particles and carbon-coating the resulting particles. SCN2 is an active material including silicon particles having an average particle diameter of about 150 nm on and inside of graphite.

The anode active material may include any suitable material available as an anode active material in addition to the anode active material described above.

Examples of the additional anode active material may include Si, Sn, Al, Ge, Pb, Bi, Sb, a Si—Y alloy (where Y is an alkali metal, an alkali earth metal, Group XIII to Group XIV elements, a transition metal, a rare earth element, or a combination thereof, and Y is not Si), a Sn—Y alloy (where Y is an alkali metal, an alkali earth metal, Group XIII to Group XIV elements, a transition metal, a rare earth element, or a combination thereof, and Y is not Sn), or a combination thereof. In some embodiments, Y may include magnesium (Mg), calcium (Ca), strontium (Sr), barium (Ba), radium (Ra), scandium (Sc), yttrium (Y), titanium (Ti), zirconium (Zr), hafnium (Hf), rutherfordium (Rf), vanadium (V), niobium (Nb), tantalum (Ta), dubnium (Db), chromium (Cr), molybdenum (Mo), tungsten (W), seaborgium (Sg), technetium (Tc), rhenium (Re), bohrium (Bh), iron (Fe), lead (Pb), ruthenium (Ru), osmium (Os), hassium (Hs), rhodium (Rh), iridium (Ir), palladium (Pd), platinum (Pt), copper (Cu), silver (Ag), gold (Au), zinc (Zn), cadmium (Cd), boron (B), aluminum (Al), gallium (Ga), tin (Sn), indium (In), titanium (Ti), germanium (Ge), phosphorus (P), arsenic (As), antimony (Sb), bismuth (Bi), sulfur (S), selenium (Se), tellurium (Te), polonium (Po), or a combination thereof. For example, a metal oxide which may be used as an additional anode active material may be a lithium titanium oxide, a vanadium oxide, or a lithium vanadium oxide.

A conducting agent and a binder used in preparation of the anode active material composition may be the same as the conducting agent and the binder used in preparation of the cathode active material composition described above, and may be at least one of the conducting agents and the binders used to prepare the cathode active material composition described above.

The amounts of the anode active material, the conducting agent, the binder, and the solvent may be determined by those of skill in the art without undue experimentation. At least one of the conducting agent, the binder, and the solvent may be omitted according to a desired use and structure of the lithium battery.

In the anode active material composition, water may be use as a solvent. In the anode according to an embodiment, water may be used as a solvent; carboxymethyl cellulose (CMC), styrene butadiene rubber (SBR), an acrylate-based polymer and/or a methacrylate-based polymer, and alginate (AG) may be used as a binder; and carbon black, acetylene black, and/or graphite may be used as a conducting agent. In the anode according to an embodiment, 94 wt % of the anode active material, 3 wt % of the binder, and 3 wt % of the conducting agent may be combined together as a mixture in the form of a powder, water is added to the mixture to prepare a slurry having a solids content of about 70 wt %, and the slurry may be coated, dried, and pressed to prepare an anode.

A thickness of the anode current collector may be in a range of about 3 µm to about 50 µm, or about 5 µm to about 40 µm, or about 7 µm to about 35 µm. A material for use as an anode current collector is not particularly limited as long as it has high electrical conductivity and does not cause a chemical change in a corresponding lithium battery. Examples of the anode current collector include copper, stainless steel, aluminum, nickel, titanium, calcined carbon, copper or stainless steel that is surface treated with carbon, nickel, titanium, or silver, an aluminum-cadmium alloy, or a combination thereof. The anode current collector, as well as the cathode current collector, may have a fine uneven structure on its surface to increase binding force between the current collector and the anode active material. The anode current collector may have various shapes, such as film, sheet, foil, net, porous, foam, or non-woven shape.

A loading level of the anode active material composition may be determined according to the loading level of the cathode active material composition. For example, a loading level of the anode active material composition may be about 12 mg/cm$^2$ or greater, about 15 mg/cm$^2$ or greater, about 18 mg/cm$^2$ or greater, or about 21 mg/cm$^2$ or greater, per one gram (g) of the anode active material composition. An anode density may be, for example, about 1.5 g/cc or greater, or about 1.6 g/cc or greater, or about 1.7 g/cc or greater. An anode, in which an energy density is important, may have an anode density in a range of about 1.65 g/cc to about 1.9 g/cc.

When the loading level and the electrode density of the anode active material are within these ranges described above, a battery including this anode active material may exhibit a high cell energy density of 500 Wh/L.

Next, a separator is prepared and is disposed between the cathode and the anode.

The separator for the lithium battery may be any separator that is suitable for use in a lithium battery. In some embodiments, the separator may have low resistance to migration of ions in an electrolyte and have an excellent electrolyte-retaining ability. Examples of the separator include glass fiber, polyester, Teflon™, polyethylene, polypropylene, polytetrafluoroethylene (PTFE), or a combination thereof, each of which may be used as a non-woven or woven fabric. For example, a rollable separator including polyethylene or polypropylene may be used for a lithium ion battery. A separator having a good organic electrolytic solution-retaining ability may be used for a lithium ion polymer battery.

For example, the separator may be manufactured in the following manner.

In some embodiments, a polymer resin, a filler, and a solvent may be mixed together to prepare a separator composition. Then, the separator composition may be directly coated on an electrode, and dried to form the separator. In some embodiments, the separator composition may be cast on a support and then dried to form a separator film, which may then be separated from the support and laminated on an electrode to form the separator.

The polymer resin used to manufacture the separator may be any material suitable for use as a binder for electrode plates. Examples of the polymer resin include a vinylidene-fluoride/hexafluoropropylene copolymer, polyvinylidene fluoride (PVDF), polyacrylonitrile, polymethylmethacrylate, or a combination thereof.

The organic electrolyte solution described above may be provided as an electrolyte between the cathode and the anode.

The electrolyte according to an embodiment may further include a non-aqueous electrolyte solution, an organic solid electrolyte, and/or an inorganic solid electrolyte, in addition of the organic electrolyte solution.

Examples of the organic solid electrolyte may include a polyethylene derivative, a polyethylene oxide derivative, a polypropylene oxide derivative, a phosphoric acid ester polymer, a polyester sulfide, a polyvinyl alcohol, a polyvinylidene fluoride, a polymer including an ionic dissociating group, or a combination thereof.

Examples of the inorganic solid electrolyte may include $Li_3N$, $LiI$, $Li_5NI_2$, $Li_3N$—$LiI$—$LiOH$, $LiSiO_4$, $Li_2SiS_3$, $Li_4SiO_4$, $Li_4SiO_4$—$LiI$—$LiOH$, $Li_3PO_4$—$Li_2S$—$SiS_2$, or a combination thereof.

Referring to FIG. 1, a lithium battery 1 includes a cathode 3, an anode 2, and a separator 4. In some embodiments, the cathode 3, the anode 2, and the separator 4 may be wound or folded, and then sealed in a battery case 5. In some embodiments, the battery case 5 may be filled with an organic electrolytic solution and sealed with a cap assembly 6, thereby completing the manufacture of the lithium battery 1. In some embodiments, the battery case 5 may be a cylindrical type, a rectangular type, or a thin-film type. For example, the lithium battery 1 may be a large-sized thin-film type battery. In some embodiments, the lithium battery 1 may be a lithium ion battery.

In some embodiments, the separator may be disposed between the cathode and the anode to form a battery assembly. In some embodiments, the battery assembly may be stacked in a bi-cell structure and impregnated with the electrolytic solution. In some embodiments, the resultant assembly may be put into a pouch and hermetically sealed, thereby completing the manufacture of a lithium ion polymer battery.

In some embodiments, a plurality of battery assemblies may be stacked to form a battery pack, which may be used in any device that benefits from high capacity and high output, for example, in a laptop computer, a smart phone, or an electric vehicle.

In the lithium battery according to another embodiment, a DCIR increase ratio may significantly decrease, and thus the lithium battery may exhibit excellent battery characteristics, as compared to a lithium battery including a general nickel-rich lithium-nickel composite oxide as a cathode active material.

A driving voltage of the lithium battery using a cathode, an anode, and an electrolyte may have, for example, a lower limit in a range of about 2.5 volts (V) to about 2.8 V and an upper limit in a range of about 4.1 V to about 4.4 V, and the lithium battery may have an energy density of about 500 Wh/L or greater.

Examples of a device using the lithium battery include power tools powered by an electric motor; electric cars, e.g., electric vehicles (EVs), hybrid electric vehicles (HEVs), plug-in hybrid electric vehicles (PHEVs); electric two-wheeled vehicles, e.g., e-bikes and e-scooters; electric golf carts; and power storage systems. However, embodiments of the device are not limited thereto.

As used herein, the term "alkyl" refers to a fully saturated branched or unbranched (straight chain or linear) aliphatic hydrocarbon group having the specified number of carbon atoms.

Examples of the alkyl group include a methyl group, an ethyl group, an n-propyl group, an isopropyl group, an n-butyl group, an isobutyl group, a sec-butyl group, an n-pentyl group, an isopentyl group, a neopentyl group, an n-hexyl group, a 3-methylhexyl group, a 2,2-dimethylpentyl group, a 2,3-dimethylpentyl, and an n-heptyl group.

At least one hydrogen atom of the alkyl group may be substituted with a C1-C20 alkyl group substituted with a halogen atom (e.g., $CCF_3$, $CHCF_2$, $CH_2F$, or $CCl_3$), a C1-C20 alkoxy group, a C2-C20 alkoxyalkyl group, a hydroxyl group, a nitro group, a cyano group, an amino group, an amidino group, a hydrazine, a hydrazone, a carboxyl group or a salt thereof, a sulfonyl group, a sulfamoyl group, a sulfonic acid group or a salt thereof, a phosphoric acid or a salt thereof, a C1-C20 alkyl group, a C2-C20 alkenyl group, a C2-C20 alkynyl group, a C1-C20 heteroalkyl group, a C6-C20 aryl group, a C6-C20 arylalkyl group, a C6-C20 heteroaryl group, a C7-C20 heteroarylalkyl group, a C6-C20 heteroaryloxy group, a C6-C20 heteroaryloxyalkyl group, or a C6-C20 heteroarylalkyl group.

As used herein, the term "cycloalkyl" refers to a monovalent group having one or more saturated rings in which all ring members are carbon.

As used herein, the term "halogen" refers to one of the elements of Group 17 of the periodic table (e.g., fluorine, bromine, chlorine, iodine, and astatine).

As used herein, the term "alkoxy" refers to an alkyl group that is linked via an oxygen (i.e., alkyl-O—), and the alkyl is the same as defined above. Examples of the alkoxy group may include a methoxy group, an ethoxy group, a 2-propoxy group, a butoxy group, a t-butoxy group, a pentyloxy group, and a hexyloxy group. At least one hydrogen atom of the alkoxy group may be substituted with the substituents described above in connection with the alkyl group.

As used herein, the term "alkenyl" refers to a branched or unbranched hydrocarbon group having at least one carbon-carbon double bond. Examples of the alkenyl group may include a vinyl group, an allyl group, a butenyl group, a propenyl group, an isobutenyl group, and at least one hydrogen atom of the alkenyl group may be substituted with the substituents described above in connection with the alkyl group.

As used herein, the term "alkynyl" refers to a branched or unbranched hydrocarbon group having at least one carbon-carbon triple bond. Examples of the alkynyl group may include an ethynyl group, a butynyl group, an isobutynyl group, and an isopropynyl group. At least one hydrogen atom of the alkynyl group may be substituted with the substituents described above in connection with the alkyl group.

As used herein, the term "aryl" refers to a cyclic moiety in which all ring members are carbon and at least one ring is aromatic, the moiety having the specified number of carbon atoms. Examples of the aryl group may include a phenyl group, a naphthyl group, and a tetrahydronaphthyl group. Also, at least one hydrogen atom of the aryl group may be substituted with the substituents described above in connection with the alkyl group.

As used herein, the term "heteroaryl" refers to a monocyclic or bicyclic organic compound in which at least one ring member is a heteroatom. The heteroatom(s) are independently N, O, P, and S, and the remaining ring atoms are carton atoms. The heteroaryl group may include, for example, 1 to 5 hetero atoms, and 5 to 10 ring members. S or N may be oxidized to various oxidation states. The heteroaromatic ring may be optionally fused to one or more aryl, cycloaliphatic, or heterocyclic rings.

Examples of the heteroaryl group may include a thienyl group, a furyl group, a pyrrolyl group, an imidazolyl group, a pyrazolyl group, a thiazolyl group, an isothiazolyl group, a 1,2,3-oxadiazolyl group, a 1,2,4-oxadiazolyl group, a 1,2,5-oxadiazolyl group, a 1,3,4-oxadiazolyl group, a 1,2,3-thiadiazolyl group, a 1,2,4-thiadiazolyl group, a 1,2,5-thiadiazolyl group, a 1,3,4-thiadiazolyl group, an isothiazol-3-yl group, an isothiazol-4-yl group, an isothiazol-5-yl group, an oxazol-2-yl group, an oxazol-4-yl group, an oxazol-5-yl group, an isooxazol-3-yl group, an isooxazol-4-yl group, an isooxazol-5-yl group, a 1,2,4-triazol-3-yl group, a 1,2,4-triazol-5-yl group, a 1,2,3-triazol-4-yl group, a 1,2,3-triazol- 5-yl group, a tetrazolyl group, a pyrid-2-yl group, a pyrid-3-yl group, a 2-pyrazin-2-yl group, a pyrazin-4-yl group, a pyrazin-5-yl group, a 2-pyrimidin-2-yl group, a 4-pyrimidin-2-yl group, and a 5-pyrimidin-2-yl group.

Hereinafter, one or more embodiments will be described in detail with reference to the following examples and comparative examples. These examples are not intended to limit the purpose and scope of the one or more embodiments.

EXAMPLES (Preparation of Organic Electrolyte Solution)

Example 1: 1.15 M of LiPF$_6$ and 1 wt % of FPPA1

A compound (fluoroethylene carbonate; FEC) represented by Formula 16a, an ethylene carbonate (EC), an ethylmethyl carbonate (EMC), and a dimethyl carbonate (DMC) were mixed at a volume ratio of 5:20:35:40 to prepare a non-aqueous organic solvent. 1.5 wt % of a compound (vinyl carbonate; VC) represented by Formula 17a, 0.3 wt % of a compound (maleic anhydride; MA) represented by Formula 19a, 0.2 wt % of a compound (methylene methyl disulfonate; MMDS) represented by Formula 21a, and 1 wt % of a fluorine-containing phosphate compound (FPPA1) represented by Formula 5 were each added to the non-aqueous organic solvent, and 1.15 M of LiPF$_6$ was used as a lithium salt to prepare an organic electrolyte solution.

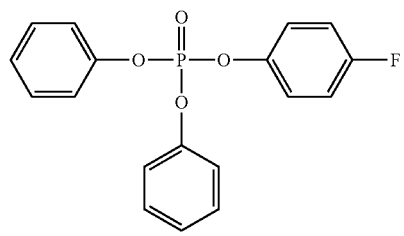

Formula 5

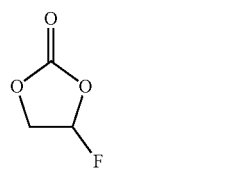

Formula 16a

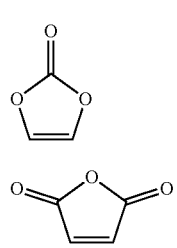

Formula 17a

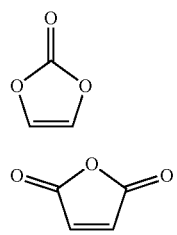

Formula 19a

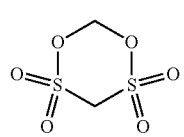

Formula 21a

Example 2: 1:1.15 M of LiPF$_6$ and 1 wt % of FPPA2

An organic electrolyte solution was prepared in the same manner as in Example 1, except that 1 wt % of a fluorine-containing phosphate compound (FPPA2) represented by Formula 10 was used instead of 1 wt % of the compound represented by Formula 5.

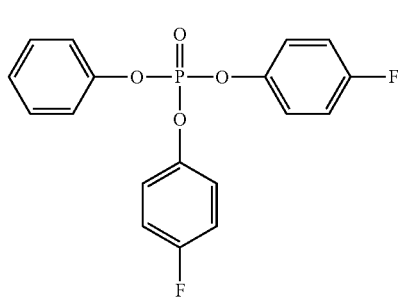

Formula 10

Example 3: 1:1.15 M of LiPF$_6$ and 2 wt % of FPPA2

An organic electrolyte solution was prepared in the same manner as in Example 1, except that 2 wt % of a fluorine-containing phosphate compound (FPPA2) represented by Formula 10 was used instead of 1 wt % of the fluorine-containing phosphate compound represented by Formula 5.

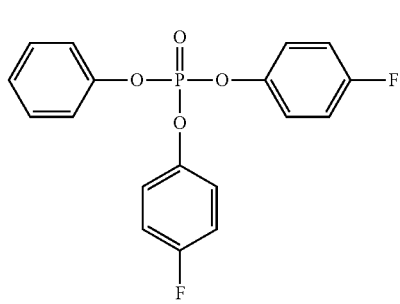

Formula 10

Comparative Example 1: 1.15 M of LiPF$_6$ and no Additive

An organic electrolyte solution was prepared in the same manner as in Example 1, except that the fluorine-containing phosphate compound represented by Formula 5 was not added.

Comparative Example 2: 1.15 M of LiPF$_6$ and 2 wt % TFEP

An organic electrolyte solution was prepared in the same manner as in Example 1, except that 2 wt % of a compound represented by Formula 25 was used instead of 1 wt % of the compound represented by Formula 5.

Formula 25

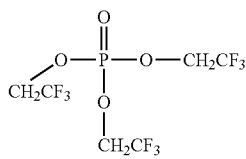

Comparative Example 3: 1.15 M of LiPF$_6$ and 2 wt % TFEP

An organic electrolyte solution was prepared in the same manner as in Example 1, except that 2 wt % of a fluorine-containing phosphate compound represented by Formula 26 was used instead of 1 wt % of the fluorine-containing phosphate compound represented by Formula 5.

Formula 26

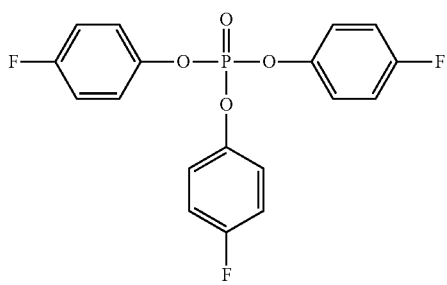

Example 4: 1.15 M of LiPF$_6$ and 1 wt % FPPA2

A compound (FEC) represented by Formula 16a, an ethylene carbonate (EC), an ethylmethyl carbonate (EMC), and a dimethyl carbonate (DMC) were mixed at a volume ratio of 5:20:35:40 to prepare a non-aqueous organic solvent. 1.5 wt % of a compound (VC) represented by Formula 17a and 1 wt % of a fluorine-containing phosphate compound (FPPA2) represented by Formula 10 were each added to the non-aqueous organic solvent, and 1.15 M of LiPF$_6$ was used as a lithium salt to prepare an organic electrolyte solution.

Formula 10

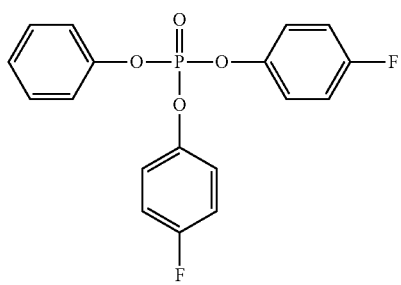

Formula 16a

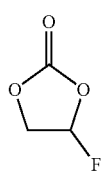

Formula 17a

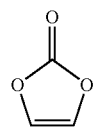

Example 5: 1.15 M of LiPF$_6$ and 1 wt % FPPA4

An organic electrolyte solution was prepared in the same manner as in Example 1, except that 1 wt % of a fluorine-containing phosphate compound (FPPA4) represented by Formula 15 was used instead of 1 wt % of the fluorine-containing phosphate compound represented by Formula 10.

Formula 15

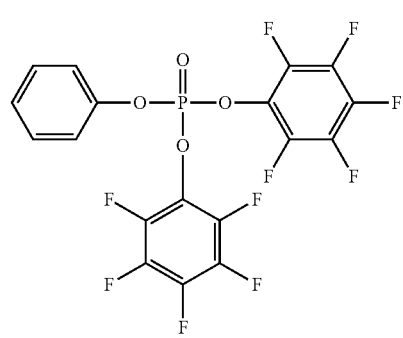

Comparative Example 4: 1.15 M of LiPF$_6$ and 1 wt % TMP

An organic electrolyte solution was prepared in the same manner as in Example 1, except that 1 wt % of a compound (trimethyl phosphate; TMP) represented by Formula 27 was used instead of 1 wt % of the fluorine-containing phosphate compound represented by Formula 5.

Formula 27

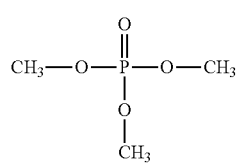

Comparative Example 5: 1.15 M of LiPF$_6$ and 1 wt % TEP

An organic electrolyte solution was prepared in the same manner as in Example 4, except that 1 wt % of a compound (triethyl phosphate; TEP) represented by Formula 28 was used instead of 1 wt % of the fluorine-containing phosphate compound represented by Formula 5.

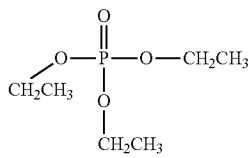

Formula 28

Comparative Example 6: 1.15 M of LiPF$_6$ and 1 wt % TFPP

An organic electrolyte solution was tried to be prepared in the same manner as in Example 4, except that 1 wt % of a compound represented by Formula 29 was used instead of 1 wt % of the fluorine-containing phosphate compound represented by Formula 5.

The compound represented by Formula 29 was not dissolved in the organic solvent but precipitated, and thus preparation of an organic electrolyte solution was not possible.

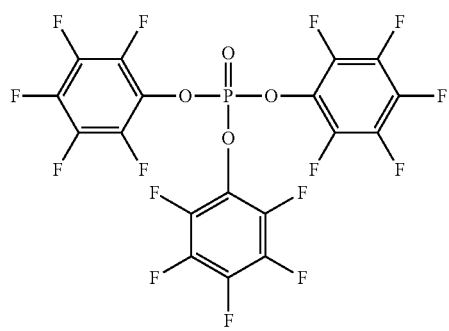

Formula 29

(Preparation of Lithium Battery (Full Cell))

Example 6: Preparation of Lithium Secondary Battery (Full Cell), Carbon-Silicon Composite Anode (SCN)

(Preparation of Cathode)

95.0 wt % of LiNi$_{0.88}$Co$_{0.10}$Mn$_{0.02}$O$_2$ as a cathode active material, 2.5 wt % of Denka black as a conducting agent, and 2.5 wt % of PVDF (Solef 6020, available from Solvay) as a binder were mixed to prepare a mixture. The mixture was added to N-methyl-2-pyrrolidone (NMP) as a solvent so that a solid content was 60%, and the solid was dispersed in the solvent for 30 minutes by using a mechanical stirrer to prepare a cathode active material composition. The cathode active material composition was two-surface coated on an aluminum foil current collector having a thickness of 12 μm by using a 3-roll coater at a loading level of 37 mg/cm$^2$, dried in a hot-air drier at 100° C. for 0.5 hours, dried again in vacuum at 120° C. for 4 hours, and roll-pressed to prepare a cathode in which a cathode active material layer having a density of 3.6 g/cc was formed on the current collector.

(Preparation of Anode)

97 wt % of a mixture prepared by mixing 85 parts by weight of graphite powder (MC20, at a purity of 99.9% or higher, available from Mitsubishi Chemical) as an anode active material and about 15 parts by weight of a carbon-silicon composite (available from BTR), in which silicon nanoparticles are on and in graphite by mechanochemically forming a composite of the carbon particles and silicon nanoparticles; and 4 wt % of an alginate (AG) binder as a binder were mixed. This mixture was added to water as a solvent so that a solid content was 50%, and the solid was dispersed in the solvent for 60 minutes by using a mechanical stirrer to prepare an anode active material composition. The anode active material composition was two-surface coated on a copper foil current collector having a thickness of 10 μm by using a 3-roll coater at a loading level of 21.87 mg/cm$^2$, dried in a hot-air drier at 100° C. for 0.5 hours, dried again in vacuum at 120° C. for 4 hours, and roll-pressed to prepare an anode in which an anode active material layer having a density of 1.65 g/cc pm was formed on the current collector. An average particle diameter of silicon nanoparticles in the carbon-silicon composite was about 150 nm, and a secondary particle average diameter of the carbon-silicon composite was about 5 μm.

(Assembly of Lithium Battery)

The cathode and the anode thus prepared, a polyethylene separator, and the electrolyte solution prepared in Example 1 as an electrolyte solution were used to prepare a 18650 cylindrical type lithium battery.

Examples 7 and 8

Lithium batteries were prepared in the same manner as in Example 6, except that the organic electrolyte solutions prepared in Examples 2 and 3 were each used instead of the organic electrolyte solution prepared in Example 1.

Comparative Examples 7 to 9

Lithium batteries were prepared in the same manner as in Example 6, except that the organic electrolyte solutions prepared in Examples 1 to 3 were each used instead of the organic electrolyte solution prepared in Example 1.

Example 9: Preparation of Lithium Secondary Battery (Full Cell), Graphite (Gr) Anode A lithium battery was prepared in the same manner as in Example 6, except that a graphite powder (MC20, at a purity of 99.9% or higher, available from Mitsubishi Chemical), instead of the carbon-silicon composite, was used as an anode active material, and that the organic electrolyte solution prepared in Example 4 was used instead of the organic electrolyte solution prepared in Example 1.

Example 10

A lithium battery was prepared in the same manner as in Example 9, except that the organic electrolyte solution prepared in Example 5 was used instead of the organic electrolyte solution prepared in Example 4.

Comparative Examples 10 and 11

A lithium battery was prepared in the same manner as in Example 9, except that the organic electrolyte solutions prepared in Comparative Examples 4 and 5 were each used instead of the organic electrolyte solution prepared in Example 4.

Evaluation Example 1: Charge/Discharge Characteristics Evaluation at High Temperature (45° C.)

At 45° C., the lithium batteries prepared in Examples 6 to 8 and Comparative Examples 7 to 9 were each charged with a constant current of a 0.2 C rate until a voltage was 3.6 V (vs. Li), and then discharged with a constant current of a 0.2 C rate until a voltage of the discharge was 2.8 V (vs. Li) (1$^{st}$ cycle of a formation process).

At 45° C., the lithium batteries that underwent the 1$^{st}$ cycle of the formation process were each charged with a constant current of a 0.2 C rate until a voltage was 4.3 V (vs. Li), and discharged with a constant current of a 0.2 C rate until a voltage of the discharge was 2.8 V (vs. Li) (2$^{nd}$ cycle of the formation process).

At 45° C., the lithium batteries that underwent the 2$^{nd}$ cycle of the formation process were each charged with a constant current of a 0.5 C rate until a voltage was 4.3 V (vs. Li), and the current was cut-off at a 0.05 C rate while the voltage was maintained at 4.3 V in a constant voltage mode (a CV mode). Then, the batteries were discharged with a constant current of a 1.0 C rate until a voltage of the discharge was 2.8 V (vs. Li). The charging/discharging cycles were repeated once more (3$^{rd}$ cycle of the formation process).

At 45° C., the lithium batteries that underwent the formation process were each charged with a constant current of a 0.5 C rate until a voltage was 4.3 V (vs. Li), and the current was cut-off at a 0.05 C rate while the voltage was maintained at 4.3 V in a CV mode. Then, the batteries were discharged with a constant current of a 1.0 C rate until a voltage of the discharge was 2.8 V (vs. Li). The cycles were repeated 200 times.

In the whole charging/discharging cycle, 10 minutes of retention time was set after every charging/discharging cycle.

Some of the charging/discharging test results are shown in Table 1. A capacity retention rate at the 200th cycle is defined as shown in Equation 1.

Capacity retention ratio at 200$^{th}$ cycle [%]=[A discharge capacity at 200$^{th}$ cycle/a discharge capacity at 1$^{st}$ cycle]×100%   Equation 1

TABLE 1

| Graphite anode | Capacity retention ratio [%] |
|---|---|
| Example 6 (FPPA1, 1 wt %) | 78.2 |
| Example 7 (FPPA2, 1 wt %) | 78.0 |
| Example 8 (FPPA2, 2 wt %) | 78.6 |
| Comparative Example 7 (no additive) | 77.4 |
| Comparative Example 8 (TFEP, 2 wt %) | 67.4 |

As shown in Table 1, the lithium batteries of Examples 6 to 8 employing the organic electrolyte solution using a fluorine-containing phosphate compound containing a fluorine-unsubstituted phenyl group had improved lifespan characteristics at high temperature compared to the lithium battery of Comparative Example 7 not including an additive and the lithium battery of Comparative Example 8 employing the organic electrolyte solution using a phosphate-based compound containing a fluorine-containing alkyl group. Also, the lithium battery of Examples 6 to 8 had improved lifetime characteristics at high temperature than those of the lithium battery of Comparative Example 9.

As shown in Table 1 of WO 2006/016733, incorporated herein by reference, trifluoroethyl phosphate (TFEP) showed improved lifespan characteristics over trifluorophenyl phosphate (TFPP).

An energy density of the lithium battery prepared in Example 6 was 710 Wh/L.

Evaluation Example 2: Direct Current Internal Resistance (DC-IR) Evaluation at Room Temperature (45° C.)

Initial direct current internal resistances (DC-IRs) of the lithium batteries prepared in Examples 6 to 8 and Comparative Examples 7 to 9 at a high temperature (45° C.) were evaluated as described below with respect to the lithium battery before the high-temperature charging (0 cycle or at an initial state) and after 200 cycles of charging/discharging.

In the 1$^{st}$ cycle, the batteries were each charged with a constant current of a 0.5 C rate until a voltage of state of charge (SOC) 50%, and the current was cut-off at a 0.02 C rate. Then, the batteries were rested for 10 minutes.

After discharging with a constant current of 0.5 C rate for 30 seconds, the batteries were each rested for 30 seconds, charged with a constant current of 0.5 C rate for 30 seconds, and rested for 10 minutes.

After discharging with a constant current of 1.0 C rate for 30 seconds, the batteries were each rested for 30 seconds, charged with a constant current of 0.5 C rate for 1 minute, and rested for 10 minutes.

After discharging with a constant current of 2.0 C rate for 30 seconds, the batteries were each rested for 30 seconds, charged with a constant current of 0.5 C rate for 2 minutes, and rested for 10 minutes.

After discharging with a constant current of 3.0 C rate for 30 seconds, the batteries were each rested for 30 seconds, charged with a constant current of 0.5 C rate for 2 minutes, and rested for 10 minutes.

Average voltage drop values for 30 seconds per each C-rate are direct-current voltage values. Direct-current resistances (DC-IR) were calculated from the measured direct-current voltages, and some of the results are shown in Table 2.

A DCIR increase ratio was calculated according to Equation 2.

DCIR increase ratio=[(DCIR after 200th cycle−initial DCIR)/initial DCIR]×100%   Equation 2

TABLE 2

| | Initial (0 cycle) DCIR [mΩ] | DCIR after 200th cycle [mΩ] | DCIR increase ratio [%] |
|---|---|---|---|
| Example 6 | 118.0 | 135.0 | 14.4% |
| Example 7 | 118.3 | 129.5 | 9.5% |
| Example 8 | 127.5 | 135.5 | 6.3% |
| Comparative Example 7 | 126.0 | 171.0 | 35.7% |
| Comparative Example 8 | 119.3 | 143.8 | 20.5% |

As shown in Table 2, the lithium batteries of Examples 6 to 8 had significantly decreased DCIR increase ratios compared to those of the lithium batteries prepared in Comparative Examples 7 and 8.

Evaluation Example 3: Evaluation of Amount of Gas Generated at High-Temperature (60° C.)

At room temperature (25° C.), the lithium batteries prepared in Examples 9 and 10 and Comparative Examples 10 and 11 were each charged with a constant current of a 0.2 C rate until a voltage was 3.6 V and discharged with a constant current of a 0.2 C rate until a voltage of the discharge was 2.8 V (formation process, 1st cycle).

In the 2nd cycle, at 25° C., the batteries underwent the 1st cycle of the formation process were each charged with a constant current of a 0.2 C rate until a voltage was 4.3 V (vs. Li); and discharged with a constant current of a 0.2 C rate until a voltage of the discharge was 2.8 V (formation process, 2nd cycle).

In the 3rd cycle, the batteries underwent the 2nd cycle of the formation process were each charged with a constant current of a 0.5 C rate until a voltage was 4.3 V (vs. Li); and the current was cut-off at a 0.05 C rate while the voltage was maintained at 4.3 V in a constant voltage mode (CV mode). Then, the batteries were discharged with a constant current of a 0.2 C rate until a voltage of the discharge was 2.8 V. This charging/discharging cycle was repeated once more (formation process, 3rd cycle).

In the 4th cycle, the batteries were each charged with a constant current of a 0.5 C rate until a voltage was 4.30 V and substantially charged with a constant voltage until the current was 0.05 C while the voltage was maintained at 4.30 V. The charged batteries were stored in an oven at 60° C. for 10 days, taken out of the oven, and discharged until a voltage of the discharge was 2.8 V. The batteries were each put into a jig and exploded to measure an amount of gas generated by converting an internal gas pressure change into a volume. Some of the results are shown in Table 3.

TABLE 3

|   | Amount of gas generation [ml/g] |
| --- | --- |
| Example 9 | 0.59 |
| Example 10 | 0.60 |
| Comparative Example 10 | 0.62 |
| Comparative Example 11 | 0.64 |

As shown in Table 3, the lithium batteries of Examples 9 and 10 had decreased amounts of gas generation compared to those of the lithium batteries of Comparative Examples 10 and 11.

As described above, according to one or more embodiments, when a lithium battery includes an organic electrolyte solution including a fluorine-containing phosphate-based compound having an asymmetric structure, a side reaction may be suppressed in the lithium battery, and lifespan characteristics of the lithium battery may improve.

It should be understood that embodiments described herein should be considered in a descriptive sense only and not for purposes of limitation. Descriptions of features or aspects within each embodiment should be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

What is claimed is:
1. An organic electrolyte solution comprising:
a lithium salt;
an organic solvent; and
a fluorine-containing phosphate compound,
wherein the fluorine-containing phosphate compound is represented by Formula 1:

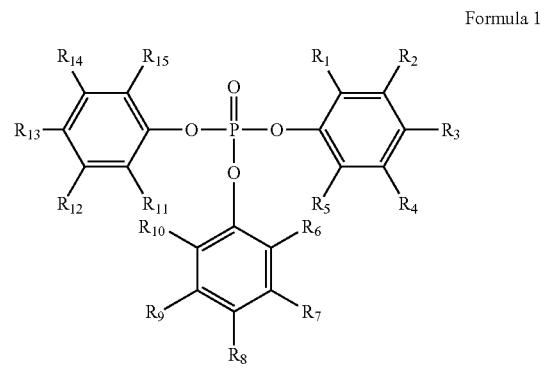

Formula 1 wherein, in Formula 1,
$R_1$, $R_2$, $R_3$, $R_4$, $R_5$, $R_6$, $R_7$, $R_8$, $R_9$, $R_{10}$, $R_{11}$, $R_{12}$, $R_{13}$, $R_{14}$, and $R_{15}$ are each independently a hydrogen atom, a fluorine atom, a C1-C5 alkyl group substituted or not substituted with a halogen atom, a C4-C10 cycloalkyl group substituted or not substituted with a halogen atom, a C6-C10 aryl group substituted or not substituted with a halogen atom, a C2-C10 heteroaryl group substituted or not substituted with a halogen atom, or a C2-C10 alkenyl group substituted or not substituted with a halogen atom,
at least one of $R_1$, $R_2$, $R_3$, $R_4$, $R_5$, $R_6$, $R_7$, $R_8$, $R_9$, $R_{10}$, $R_{11}$, $R_{12}$, $R_{13}$, $R_{14}$, or $R_{15}$ is a fluorine atom,
at least one phenyl group does not have a fluorine atom,
wherein an amount of the fluorine-containing phosphate compound represented by Formula 1 is in a range of about 0.01 weight percent to about 10 weight percent, based on a total weight of the organic electrolyte solution.

2. The organic electrolyte solution of claim 1, wherein the fluorine-containing phosphate compound represented by Formula 1 is at least one compound represented by Formula 2 or Formula 3:

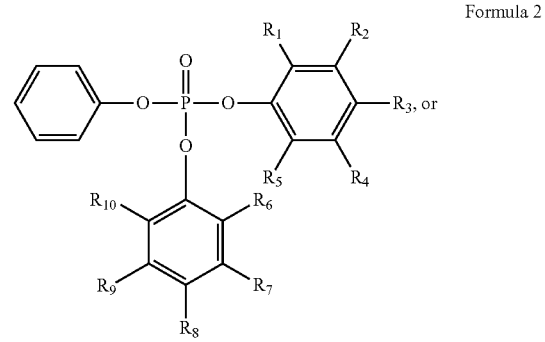

Formula 2

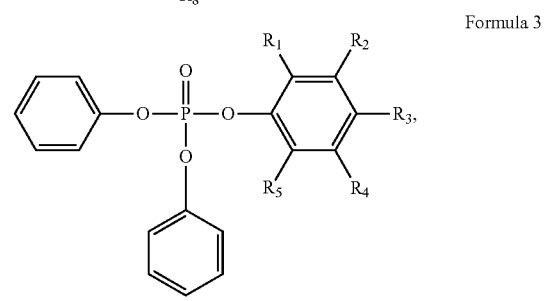

Formula 3 wherein, in Formulae 2 and 3, $R_1$, $R_2$, $R_3$, $R_4$, $R_5$, $R_6$, $R_7$, $R_8$, $R_9$, and $R_{10}$ are each independently a hydrogen atom, a fluorine atom, a C1-C5 alkyl group substituted or not substituted with a fluorine atom, a C4-C10 cycloalkyl group substituted or not substituted with a fluorine atom, a C6-C10 aryl group substituted or not substituted with a fluorine atom, a C2-C10 heteroaryl group substituted or not substituted with a fluorine atom, or a C2-C10 alkenyl group substituted or not substituted with a fluorine atom, and at least one of $R_1$, $R_2$, $R_3$, $R_4$, $R_5$, $R_6$, $R_7$, $R_8$, $R_9$, or $R_{10}$ is a fluorine atom.

3. The organic electrolyte solution of claim 1, wherein the fluorine-containing phosphate compound represented by Formula 1 is a compound represented by at least one of Formula 4 to Formula 9:

Formula 4

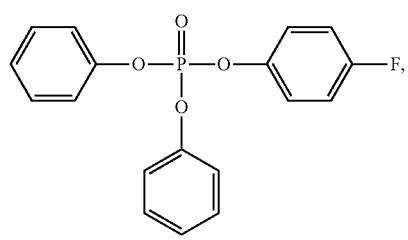

Formula 5

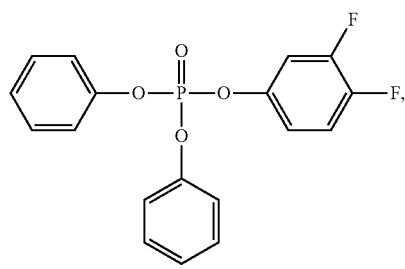

Formula 6

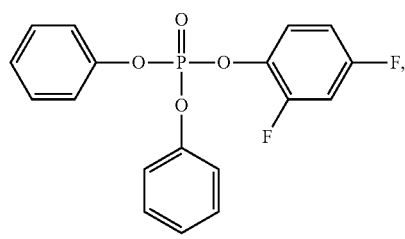

Formula 7

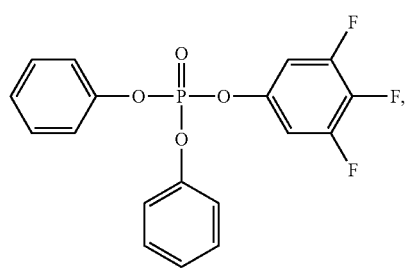

Formula 8

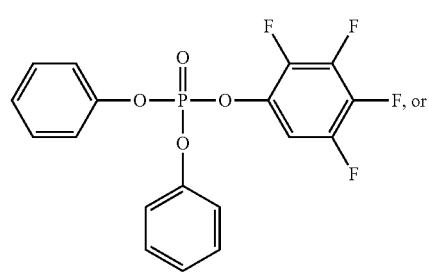

Formula 9

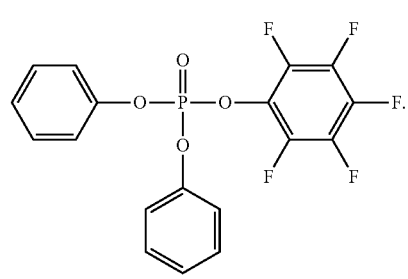

4. The organic electrolyte solution of claim 1, wherein the fluorine-containing phosphate compound represented by Formula 1 is compound represented by at least one of Formula 10 to Formula 15:

Formula 10

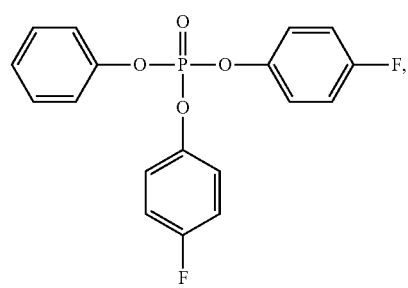

Formula 11

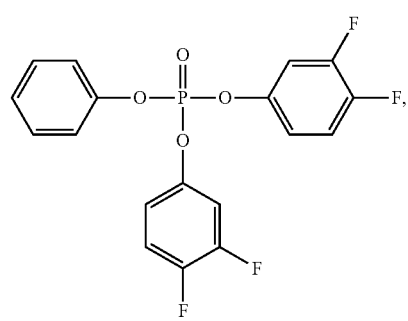

Formula 12

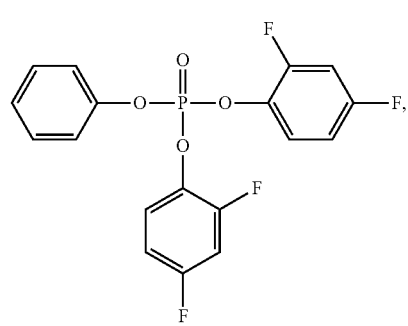

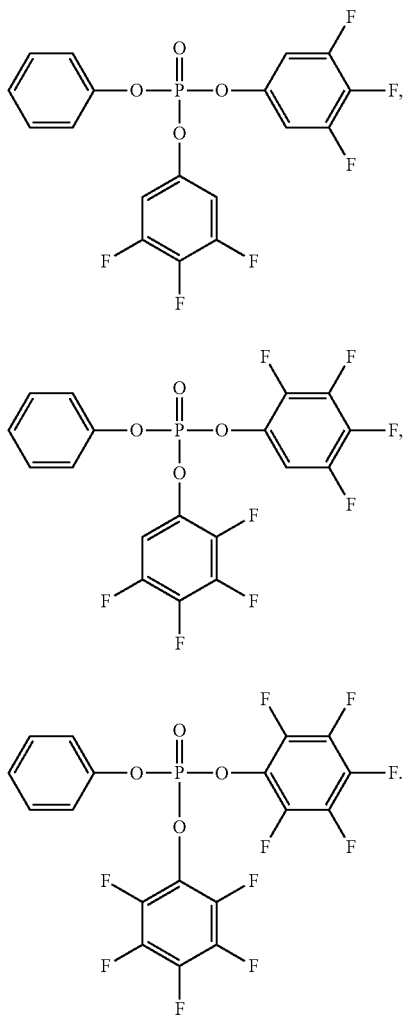

Formula 13

Formula 14

Formula 15

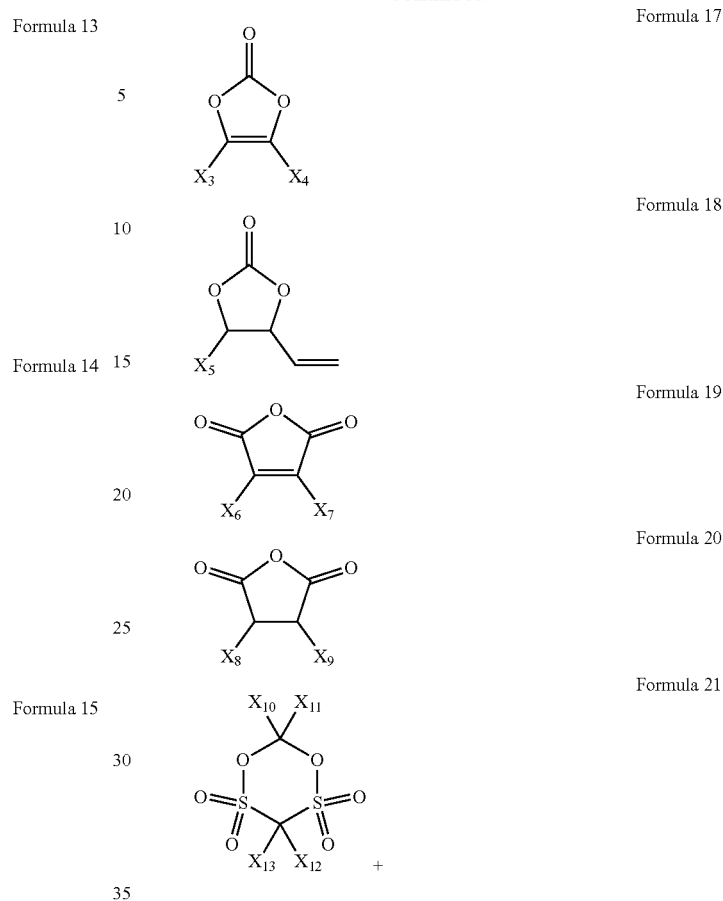

Formula 16
Formula 17
Formula 18
Formula 19
Formula 20
Formula 21 wherein, in Formulae 16 to 21,
$X_1$, $X_2$, $X_3$, $X_4$, $X_5$, $X_6$, $X_7$, $X_8$, $X_9$, $X_{10}$, $X_{11}$, $X_{12}$, and $X_{13}$ are each independently a hydrogen atom or a halogen atom, and at least one of $X_1$ or $X_2$ is a fluorine atom.

8. The organic electrolyte solution of claim 7, wherein when the compound represented by Formula 16 is present, an amount of the at least one compound represented by Formula 16 is up to 10 volume percent based on the total volume of the organic solvent.

9. The organic electrolyte solution of claim 7, wherein when at least one of compounds represented by Formula 17 to Formula 21 is present, an amount of the at least one compound represented by at least one of Formula 17 to Formula 21 is up to 3 weight percent based on the total weight of the organic electrolyte solution.

10. The organic electrolyte solution of claim 1, wherein the organic solvent comprises at least one of ethylmethyl carbonate, methylpropyl carbonate, ethylpropyl carbonate, dimethyl carbonate, diethyl carbonate, dipropyl carbonate, propylene carbonate, ethylene carbonate, butylene carbonate, ethyl propionate, ethyl butyrate, acetonitrile, succinonitrile, adiponitrile, dimethyl sulfoxide, dimethyl formamide, dimethyl acetamide, gamma-valerolactone, gamma-butyrolactone, or tetrahydrofuran.

11. The organic electrolyte solution of claim 1, wherein the organic electrolyte solution comprises:
a fluorine-containing phosphate compound represented by one of Formula 4 to Formula 15 in an amount in a range of about 0.01 weight percent to about 2.0 weight percent, 5. The organic electrolyte solution of claim 1, wherein an amount of the fluorine-containing phosphate compound represented by Formula 1 is about 2 weight percent or less based on the total weight of the organic electrolyte solution.

6. The organic electrolyte solution of claim 1, wherein an amount of the fluorine-containing phosphate compound represented by Formula 1 is in a range of about 0.5 weight percent to about 2 weight percent based on the total weight of the organic electrolyte solution.

7. The organic electrolyte solution of claim 1, further comprising at least one of compounds represented by Formula 16 to Formula 21:

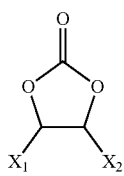

a compound represented by Formula 17a in an amount in a range of about 0.1 weight percent to about 2.0 weight percent, a compound represented by Formula 19a in an amount in a range of about 0.1 weight percent to about 1.0 weight percent, and a compound represented by Formula 21a in an amount in a range of about 0.1 weight percent to about 1.0 weight percent, wherein the weight percents are based on the total weight of the organic electrolyte solution; and the organic solvent comprises a compound represented by Formula 16a in an amount in a range of about 1 volume percent to about 10 volume percent, based on a total volume of the organic solvent:

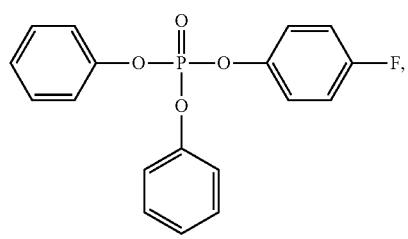

Formula 4

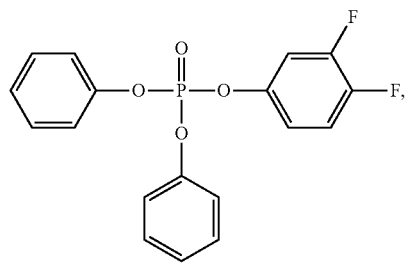

Formula 5

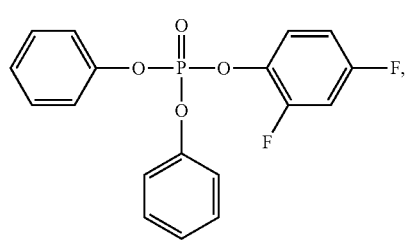

Formula 6

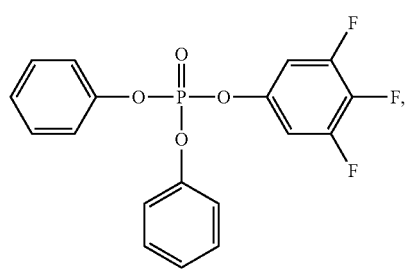

Formula 7

-continued

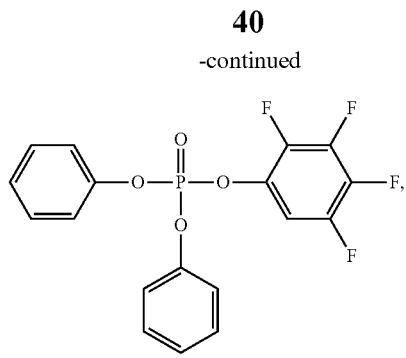

Formula 8

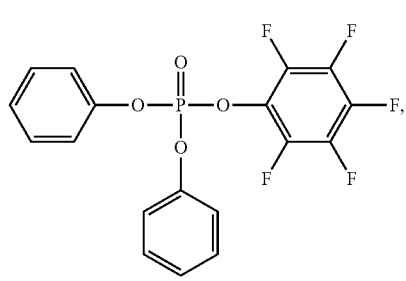

Formula 9

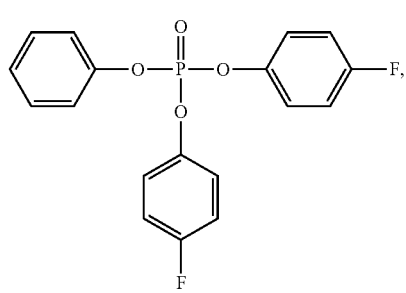

Formula 10

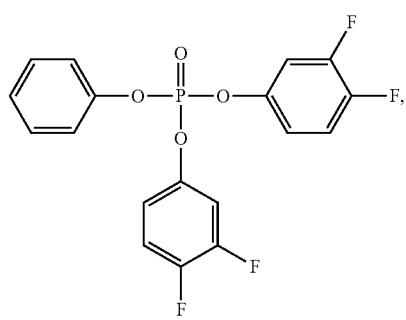

Formula 11

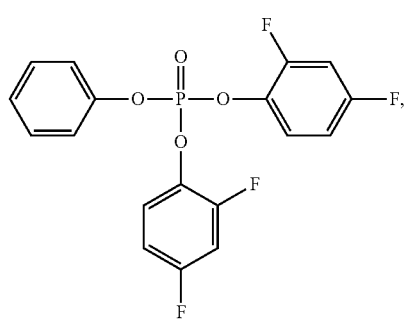

Formula 12

-continued

Formula 13
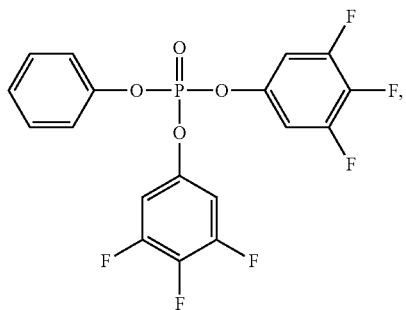

Formula 14
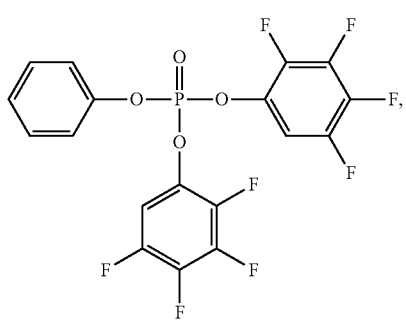

Formula 15
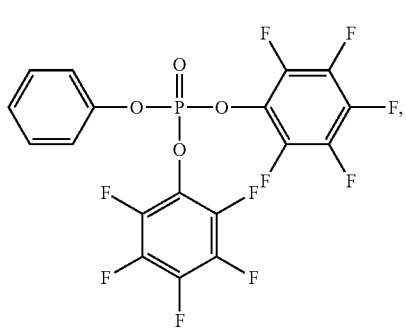

Formula 16a
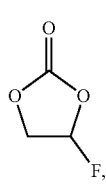

Formula 17a
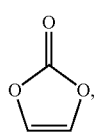

Formula 19a
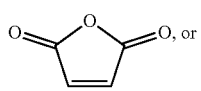

Formula 21a
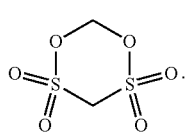

12. The organic electrolyte solution of claim 1, wherein the lithium salt comprises at least one of $LiPF_6$, $LiBF_4$, $LiCF_3SO_3$, $Li(CF_3SO_2)_2N$, $LiC_2F_5SO_3$, $Li(FSO_2)_2N$, $LiC_4F_9SO_3$, $LiN(SO_2CF_2CF_3)_2$, or a compound represented by Formula 30 to Formula 33:

Formula 30
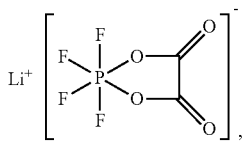

Formula 31
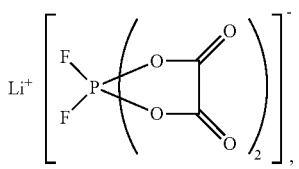

Formula 32
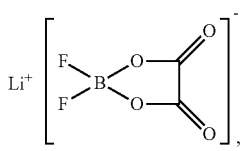

Formula 33
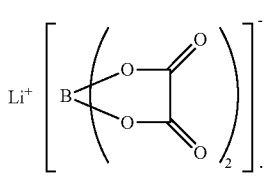

13. The organic electrolyte solution of claim 1, wherein a concentration of the lithium salt is in a range of about 0.01 molar to about 5.0 molar.

14. A lithium battery comprising:
a cathode comprising a cathode active material;
an anode comprising an anode active material; and
the organic electrolyte solution of claim 1 between the cathode and the anode,
wherein the cathode active material comprises a lithium transition metal oxide comprising nickel and at least one transition metal other than nickel, and wherein an amount of nickel in the lithium transition metal oxide is about 80 mole percent or greater based on the total moles of transition metals.

15. The lithium battery of claim 14, wherein the lithium transition metal oxide is represented by Formula 22:

$$Li_aNi_xCo_yM_zO_{2-b}A_b \qquad \text{Formula 22}$$

wherein, in Formula 22,
$1.0 \le a \le 1.2$, $0 \le b \le 0.2$, $0.8 \le x < 1$, $0 < y \le 0.3$, $0 < z \le 0.3$, and $x+y+z=1$;
M is at least one of manganese, vanadium, magnesium, gallium, silicon, tungsten, molybdenum, iron, chrome, copper, zinc, titanium, aluminum, or boron; and
A is at least one of F, S, Cl, or Br.

16. The lithium battery of claim 14, wherein the lithium transition metal oxide is a compound represented by at least one of Formulae 23 or Formula 24:

$$LiNi_xCo_yMn_zO_2 \qquad \text{Formula 23}$$

$$LiNi_xCo_yAl_zO_2 \qquad \text{Formula 24}$$

wherein, in Formula 23 and Formula 24, $0.8 \leq x \leq 0.95$, $0 < y \leq 0.2$, and $0 < z \leq 0.1$.

17. The lithium battery of claim 14, wherein the anode active material comprises at least one of a silicon compound, a carbon compound, a composite of a silicon compound and a carbon compound, or a silicon oxide.

18. The lithium battery of claim 17, wherein the composite of the silicon compound and the carbon compound comprises silicon nanoparticles.

19. The lithium battery of claim 18, wherein a size of the composite of the silicon compound and the carbon compound is in a range of about 5 micrometers to about 20 micrometers, and a size of the silicon nanoparticles is 200 nanometers or less.

20. The lithium battery of claim 14, wherein the lithium battery has a capacity retention ratio at 45° C. of about 70% or greater as measured after 200 cycles of charging/discharging.

21. The lithium battery of claim 14, wherein the lithium battery has a direct current internal resistance increase ratio at 45° C. of about 20% or less as measured after 200 cycles of charging/discharging.

22. The lithium battery of claim 14, wherein an energy density per cell unit volume is 500 Watt hours per liter or greater.

23. An organic electrolyte solution comprising:
a lithium salt;
an organic solvent; and
a fluorine-containing phosphate compound,
wherein the fluorine-containing phosphate compound is represented by Formula 1:

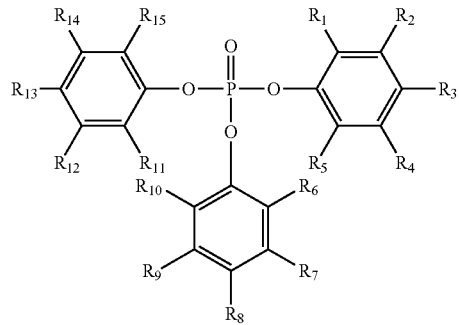

Formula 1 wherein, in Formula 1,
$R_1, R_2, R_3, R_4, R_5, R_6, R_7, R_8, R_9, R_{10}, R_{11}, R_{12}, R_{13}, R_{14}$, and $R_{15}$ are each independently a hydrogen atom, a fluorine atom, a C1-C5 alkyl group substituted or not substituted with a halogen atom, a C4-C10 cycloalkyl group substituted or not substituted with a halogen atom, a C6-C10 aryl group substituted or not substituted with a halogen atom, a C2-C10 heteroaryl group substituted or not substituted with a halogen atom, or a C2-C10 alkenyl group substituted or not substituted with a halogen atom,
at least two of $R_1, R_2, R_3, R_4, R_5, R_6, R_7, R_8, R_9, R_{10}, R_{11}, R_{12}, R_{13}, R_{14}$, or $R_{15}$ are a fluorine atom, and
at least one phenyl group does not have a fluorine atom.

* * * * *